US009423731B2

(12) United States Patent
Tanaka et al.

(10) Patent No.: US 9,423,731 B2
(45) Date of Patent: Aug. 23, 2016

(54) IMAGE FORMING APPARATUS AND NON-TRANSITORY RECORDING MEDIUM HAVING RECORDED THEREIN TEMPERATURE CONTROL PROGRAM FOR USE IN IMAGE FORMING APPARATUS

(71) Applicant: KONICA MINOLTA, INC., Chiyoda-ku (JP)

(72) Inventors: Toshiaki Tanaka, Toyokawa (JP); Yasuhiro Ishihara, Toyohashi (JP); Toshinori Inomoto, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/340,803

(22) Filed: Jul. 25, 2014

(65) Prior Publication Data
US 2015/0030346 A1    Jan. 29, 2015

(30) Foreign Application Priority Data
Jul. 26, 2013   (JP) .................................. 2013-155400

(51) Int. Cl.
G03G 15/20    (2006.01)
G06K 15/12    (2006.01)
G06K 15/02    (2006.01)

(52) U.S. Cl.
CPC .......... *G03G 15/2039* (2013.01); *G03G 15/205* (2013.01); *G06K 15/12* (2013.01); *G06K 15/1822* (2013.01); *G03G 2215/0132* (2013.01)

(58) Field of Classification Search
CPC .................. G03G 15/2039; G03G 15/2078
See application file for complete search history.

(56) References Cited

U.S. PATENT DOCUMENTS

2009/0196644 A1    8/2009 Funatsu
2011/0217061 A1    9/2011 Ichikawa et al.
(Continued)

FOREIGN PATENT DOCUMENTS

EP    2400349 A1    12/2011
EP    2450754 A2    5/2012
(Continued)

OTHER PUBLICATIONS

The extended European Search Report issued on Dec. 15, 2014, by the European Patent Office in corresponding European Application No. 14178721.8-1560. (6 pages).

*Primary Examiner* — Erika J Villaluna
(74) *Attorney, Agent, or Firm* — Buchanan Ingersoll & Rooney PC

(57) ABSTRACT

An image forming apparatus forms a toner image of text on a recording sheet based on PDL data prescribing text data and one or more print conditions of thereof, and thermally fixes the toner image, and includes: condition acquisition unit analyzing the PDL data to acquire, as the conditions, one or more of character number, character spacing, and line spacing from the PDL data; judgment unit judging for each condition, by comparing the condition with reference value, the judgment indicating whether the condition is suitable for ensuring fixability of the toner image if thermally fixed at a temperature that is lower than predetermined temperature; and temperature control unit, when the judgment unit judges negatively for at least one condition, setting a fixing temperature for thermally fixing the toner image to the predetermined temperature, when the judgment unit judges affirmatively for all conditions, setting the fixing temperature to the lower temperature.

27 Claims, 11 Drawing Sheets

(56) References Cited

U.S. PATENT DOCUMENTS

2011/0318038 A1   12/2011  Yoshizumi
2012/0069358 A1*   3/2012  Nakajima .......... G03G 15/2039
                                                           358/1.9
2012/0114358 A1    5/2012  Sugiyama et al.
2012/0315060 A1   12/2012  Sugiyama et al.

FOREIGN PATENT DOCUMENTS

| JP | 10-288911 A | * | 10/1998 |
| JP | 2008-268784 A1 | | 11/2008 |
| JP | 2009-181065 A | | 8/2009 |
| JP | 2012-118496 A | | 6/2012 |

* cited by examiner

IMAGE FORMING APPARATUS AND NON-TRANSITORY RECORDING MEDIUM HAVING RECORDED THEREIN TEMPERATURE CONTROL PROGRAM FOR USE IN IMAGE FORMING APPARATUS

CROSS-REFERENCE TO RELATED APPLICATIONS

This application is based on application No. 2013-155400 filed in Japan, the contents of which are hereby incorporated by reference.

BACKGROUND OF THE INVENTION (1) Field of the Invention

The present invention relates to an image forming apparatus that performs a print operation by thermally fixing an unfixed image formed on a recording sheet, such as a printer and a copying machine. The present invention relates particularly to an art of controlling a fixing temperature for thermal fixing for the purpose of energy saving.

(2) Related Art

Image forming apparatuses such as printers and copy machines perform a print operation by forming a toner image on a recording sheet using page description language (PDL) data, and thermally fixing the toner image. The PDL data prescribes image data and print conditions of the image data.

A fixing temperature that is necessary for thermally fixing toner images differs depending on conditions such as amount of toner deposited on recording sheets and the type of image formed on recording sheets. Accordingly, in order to avoid fixing failure, the fixing temperature is generally set to a target temperature that ensures an excellent fixability even under print conditions that the largest heat amount for thermal fixing is necessary.

On the other hand, from the standpoint of energy saving for reducing electrical power consumption of image forming apparatuses, thermal fixing of all images at the target temperature results in excessive consumption of electrical power. This is not desirable.

As an art of reducing electrical power consumption used in thermal fixing such as described above, Patent Literature 1 (Japanese Patent Application Publication No. 2008-268784) discloses for example an art of acquiring the number of dots in an image region to calculate a printing rate of the image region as an index of an amount of deposited toner, and controlling a fixing temperature for thermal fixing based on the calculated printing rate.

According to this art, when an image has a high printing rate and needs a large heat amount for thermal fixing to ensure fixability, the fixing temperature is set high, for example set to the above target temperature, and thereby to avoid fixing failure. Also, when an image has a low printing rate and needs not so a large heating amount for thermal fixing to ensure fixability, the fixing temperature is set lower than the target temperature, and thereby to reduce electrical power consumption during thermal fixing.

As a result, it is possible to ensure fixability and reduce electrical power consumption, and thereby to realize energy saving.

According to the above conventional art, however, rasterizing process needs to be performed on image data described in the PDL to acquire the number of dots. This takes it a long time to set the fixing temperature of an image to be printed, and a start time of controlling the fixing temperature is delayed. As a result, start of print operation is delayed and productivity of print operation decreases. Especially, print operation of a large amount of print is greatly influenced by decrease in productivity of print operation.

SUMMARY OF THE INVENTION

In order to solve the above problem, one aspect of the present invention provides an image forming apparatus that forms a toner image of text on a recording sheet based on page description language (PDL) data, and thermally fixes the toner image, the PDL data prescribing text data and one or more print conditions of the text data, the image forming apparatus comprising: a condition acquisition unit that analyzes the PDL data to acquire, as the print conditions, one or more of a character number, a character spacing, and a line spacing from the PDL data; a judgment unit that makes a judgment for each of the acquired print conditions, by comparing the acquired print condition with a reference value corresponding to the acquired print condition, the judgment indicating whether the acquired print condition is suitable for ensuring fixability of the toner image if the toner image is thermally fixed at a temperature that is lower than a predetermined temperature; and a temperature control unit that, when the judgment unit judges negatively with respect to at least one of the acquired print conditions, sets a fixing temperature at which the toner image is to be thermally fixed to the predetermined temperature, and when the judgment unit judges affirmatively with respect to all of the acquired print conditions, sets the fixing temperature to the temperature that is lower than the predetermined temperature.

BRIEF DESCRIPTION OF THE DRAWINGS

These and other objects, advantages and features of the invention will become apparent from the following description thereof taken in conjunction with the accompanying drawings those illustrate a specific embodiments of the invention.

In the drawings.

DESCRIPTION OF PREFERRED EMBODIMENTS

The following describes an embodiment of an image forming apparatus according to one aspect of the present invention, by way of a tandem-type digital color printer (hereinafter, referred to simply as printer).

[1] Structure of Printer

Figure 1:
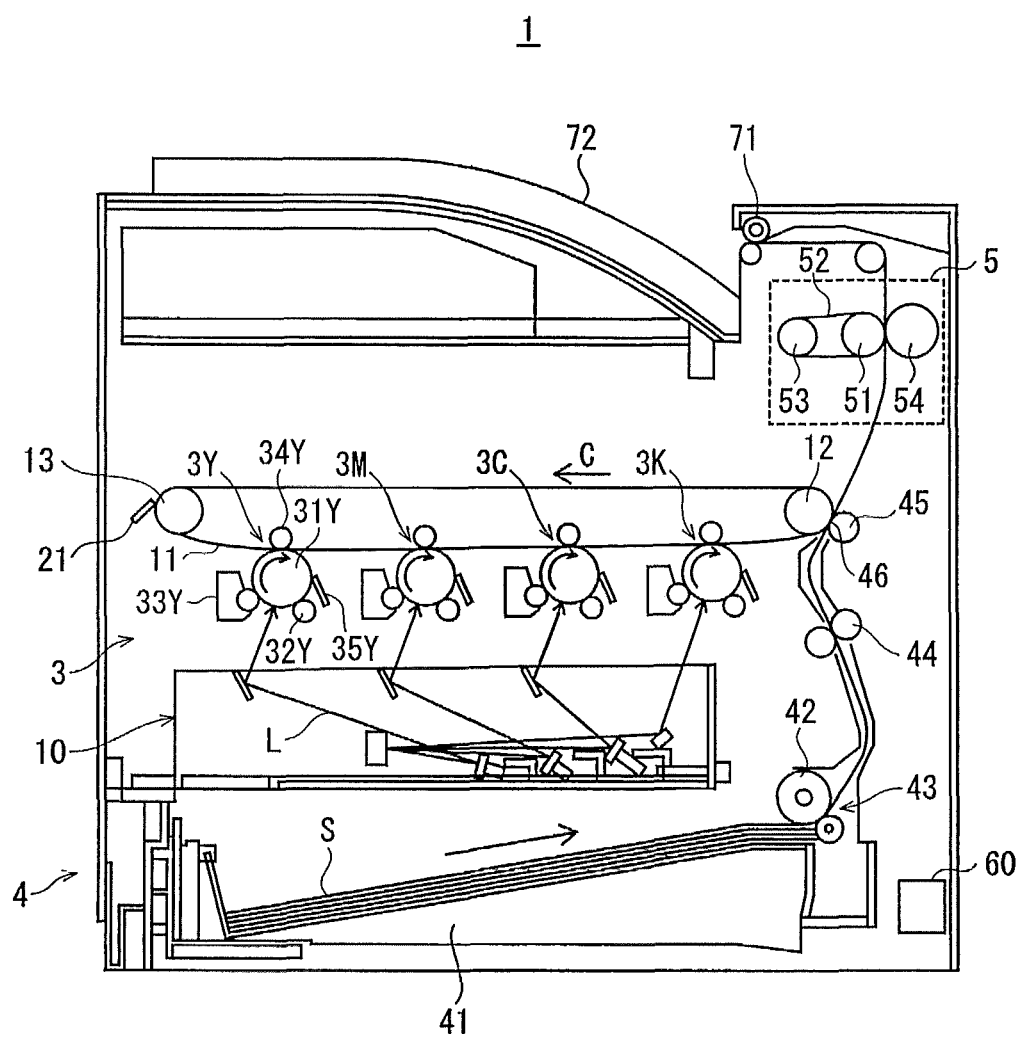
FIG. 1 shows the structure of a printer 1.

The following describes the structure of a printer 1 relating to the present embodiment. FIG. 1 shows the structure of the printer 1 relating to the present embodiment. As shown in the figure, the printer 1 includes an image process unit 3, a sheet feeding unit 4, a fixing device 5, and a control unit 60. The printer 1 is connected to a network such as a LAN to receive a request for executing a print operation from an external terminal device (not illustrated) or from an operation panel 7 (illustrated in FIG. 4) having a display unit which is not illustrated. Upon receipt of such a request, the printer 1 forms toner images of the respective colors of yellow, magenta, cyan, and black, and sequentially transfers the toner images to a recording sheet, such that a full-color image is formed on the recording sheet to complete the print operation. In the following description, the reproduction colors of yellow, magenta, cyan, and black are denoted as Y, M, C and K, respectively, and any structural component related to one of the reproduction colors is denoted by a reference sign attached with an appropriate subscript Y, M, C or K.

The image process unit 3 includes image creation units 3Y, 3M, 3C, and 3K, an exposure unit 10, an intermediate transfer belt 11, a secondary transfer roller 45, and so on. Since the image creation units 3Y, 3M, 3C, and 3K all have identical structures, the following description is given mainly to the structure of the image creation unit 3Y.

The image creation unit 3Y includes a photoconductive drum 31Y and also includes a charger 32Y, a developer 33Y, a primary transfer roller 34Y, a cleaner 35Y, and so on, which are disposed about the photoconductive drum 31Y. The cleaner 35Y is provided for cleaning the photoconductive drum 31Y. The image creation unit 3Y forms a yellow toner image on the photoconductive drum 31Y. The developer 33Y is disposed to face the photoconductive drum 31Y, and carries charged toner particles to the photoconductive drum 31Y. The intermediate transfer belt 11 is an endless belt wound around a drive roller 12 and a passive roller 13 in taut condition to run in the direction indicated by the arrow C. In the vicinity of the passive roller 13, a cleaner 21 is disposed to remove residual toner from the intermediate transfer belt 11.

The exposure unit 10 includes a light emitting element such as a laser diode. In accordance with drive signals from the control unit 60, the exposure unit 10 emits a laser beam L to sequentially scan the photoconductive drums of the image creation units 3Y, 3M, 3C, and 3K to form images of the respective colors of Y, M, C, and K. As a result of the exposure scan, an electrostatic latent image is developed on the photoconductive drum 31Y charged by the charger 32Y. In a similar manner, an electrostatic latent image is formed on the photoconductive drum in each of the image creation units 3M, 3C, and 3K.

The electrostatic latent image formed on each photoconductive drum is developed by the developer of a corresponding one of the image creation units 3Y, 3M, 3C, and 3K, such that a toner image of a corresponding color is formed on the photoconductive drum. The toner images thus formed are sequentially transferred with appropriately adjusted timing by the primary transfer rollers of the image creation unit 3Y, 3M, 3C, and 3K (in FIG. 1, only the primary transfer roller of the image creation unit 3Y bears the reference sign 34Y, whereas the reference signs of the other primary transfer rollers are omitted) in the process of primary transfer, such that the toner images are layered at the precisely same position on the intermediate transfer belt 11. Then, in the process of secondary transfer, the toner images layered on the intermediate transfer belt 11 are transferred all at once onto a recording sheet by the action of the electrostatic force imposed by the secondary transfer roller 45.

The recording sheet having the toner images secondarily transferred thereon is further carried to the fixing device 5 where the unfixed toner images on the recording sheet is heated and pressed to be thermally fixed. The recording sheet is then ejected by a pair of ejecting rollers 71 onto an exit tray 72.

The sheet feeding unit 4 includes a sheet feeding cassette 41 for storing recording sheets (denoted by a reference sign S in FIG. 1), a pickup roller 42 that picks up recording sheets from the sheet feeding cassette 41 one sheet at a time and feeds the recording sheet onto a conveyance path 43, and a pair of timing rollers 44 that adjusts the timing to transport the fed recording sheet to a secondary transfer position 46.

Note that the number of sheet feeding cassettes is not limited to one, and a plurality of sheet feeding cassettes may be provided. Examples of recording sheets include sheets of paper differing in size and thickness (plain paper and thick paper) and film sheets such as OHP film sheets. In the case where a plurality of sheet feeding cassettes are provided, each cassette may be used to store recording sheets of a specific size, thickness, or material.

The timing roller 44 forwards a recording sheet to the secondary transfer position 46 with the timing when the toner images transferred to be layered on the intermediate transfer belt 11 in the process of primary transfer are carried to the secondary transfer position 46. At the secondary transfer position 46, the toner images layered on the intermediate transfer belt 11 are transferred to the recording sheet at once by the secondary transfer roller 45.

Each roller, including the pickup roller 42 and the pair of timing rollers 44, is powered by a driving motor (not illustrated), and driven to rotate via power transmission mechanisms such as gears and belts (not illustrated). Examples of the transfer motor include a stepping motor capable of controlling the rotational speed with high precision.

The fixing device 5 includes a fixing roller 51, a heating roller 53, a fixing belt 52 wound around the fixing roller 51 and the heating roller 53 in taut condition, a pressing roller 54, a pressure roller driving motor (not illustrated), a temperature sensor (not illustrated), and so on. The pressing roller 54 presses the fixing belt 52 against the fixing roller 51 to form a fixing nip. The pressure roller driving motor drives the pressing roller 54 to rotate. The temperature sensor detects a surface temperature of an external circumferential surface of the heating roller 53.

When the pressing roller 54 is driven by the pressure roller driving motor to rotate, the fixing roller 51, the heating belt 52, and the heating roller 53 passively rotate. The engine control unit 80 which will be described later controls the pressure roller driving motor, which in turn controls the rotational speed of the fixing belt 52 and the pressing roller 54.

The heating roller 53 includes therein a heater such as halogen heater lamp (not illustrated). Since the heater is switched between on and off by the engine control unit 80 which will be described later, the surface temperature of the fixing belt 52 heated by the heating roller 53 is controlled to be a predetermined value.

The temperature sensor is of a non-contact type, and is for example a thermopile, a non-contact thermistor, or an NC sensor. A non-contact thermopile is used here as the temperature sensor.

[2] Structure of Control Unit

Figure 2:
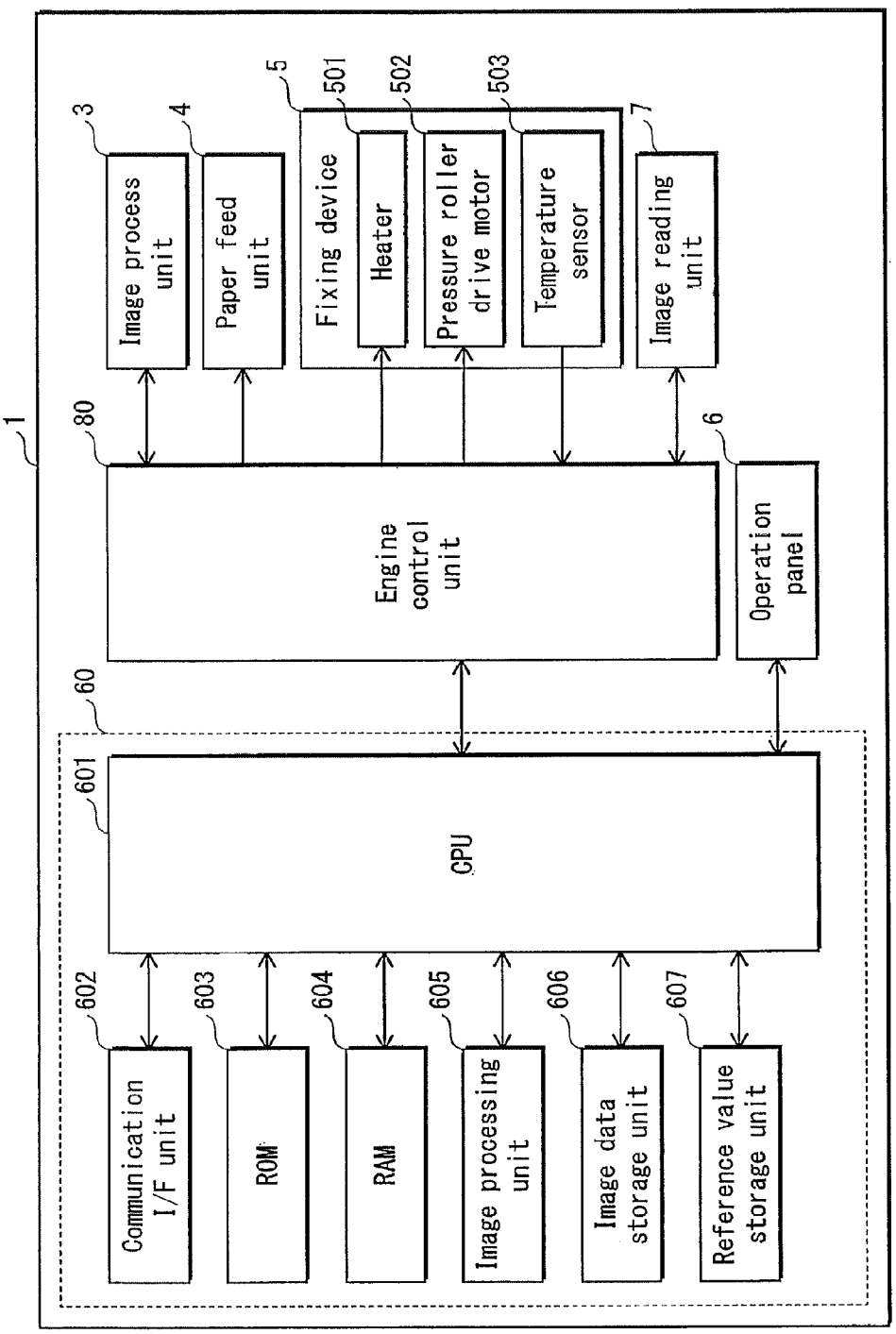
FIG. 2 is a block diagram showing the structure of the control unit 60 in relation to major components controlled by the control unit 60 in the printer 1.

FIG. 2 is a block diagram showing the structure of the control unit 60 in relation to major components controlled by the control unit 60 in the printer 1. The control unit 60 is a common computer. As shown in the figure, the control unit 60 includes a central processing unit (CPU) 601, a communication interface (I/F) unit 602, a read only memory (ROM) 603, a random access memory (RAM) 604, an image processing unit 605, an image data storage unit 606, a reference value storage unit 607, and so on.

The communication I/F unit 602 is an interface for connection to a LAN through a LAN card or a LAN board. The ROM 603 stores therein programs used for controlling the engine control unit 80, the operation panel 6, and so on. The ROM 603 also stores therein programs used for executing fixing temperature setup processing which will be described later. The RAM 604 is used by the CPU 601 as a work area at the time of program execution.

The image processing unit 605 acquires, via the communication I/F unit 602, page description language (PDL) data that prescribes image data and a print condition of the image data, which is transmitted as a print job from an external terminal device. Then, the image processing unit 605 performs rasterizing process to convert the PDL image data into image data for printing (bitmap data).

Figure 3:
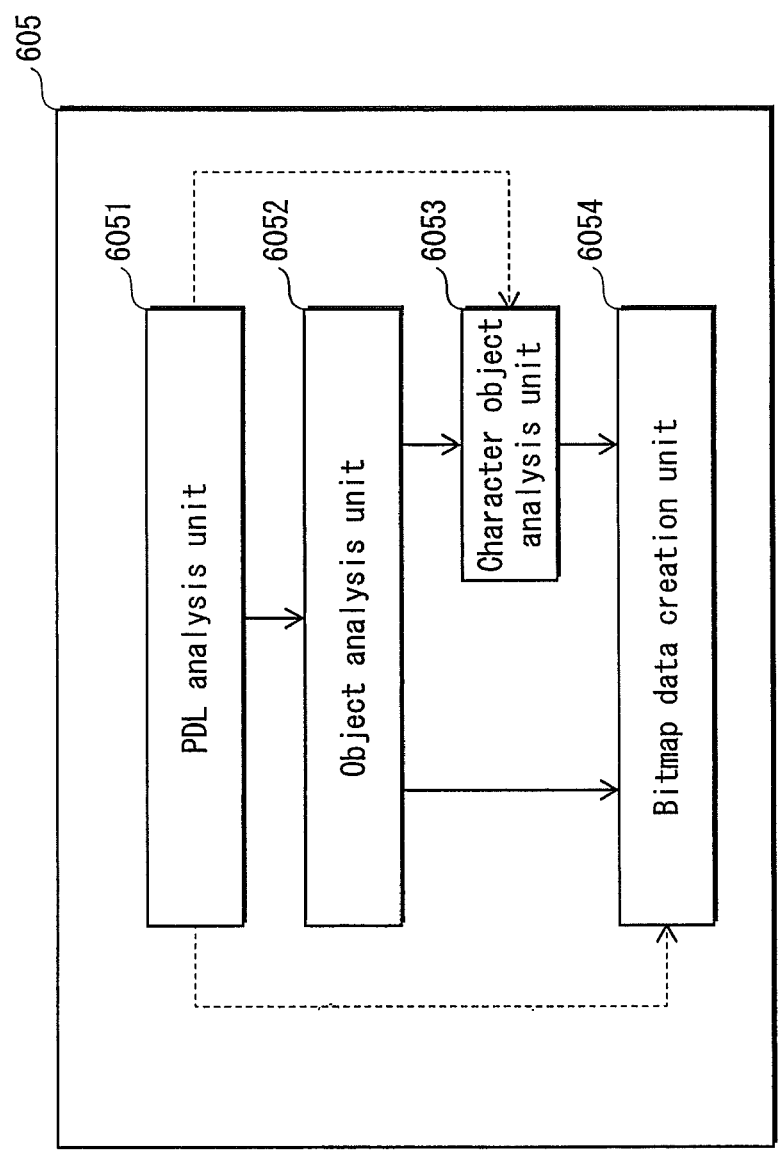
FIG. 3 is a functional block diagram showing the structure of the image processing unit 605.

FIG. 3 is a functional block diagram showing the structure of the image processing unit 605. As shown in the figure, the image processing unit 605 includes a PDL analysis unit 6051, an object analysis unit 6052, a character object analysis unit 6053, and a bitmap data creation unit 6054.

Figure 4:
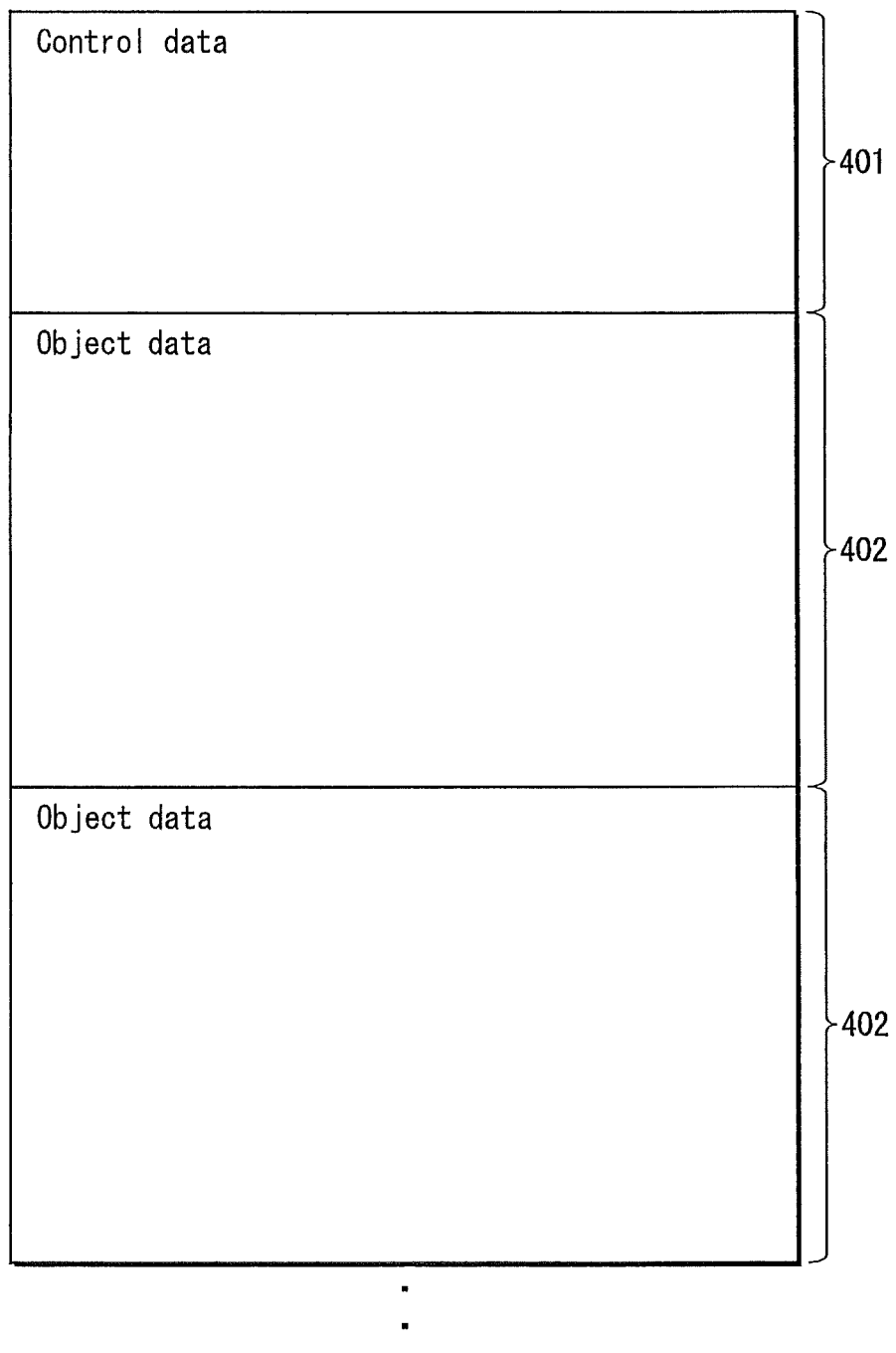
FIG. 4 schematically shows the structure of PDL data.

FIG. 4 schematically shows the structure of PDL data. As shown in the figure, the PDL data is constituted from control data 401 and object data 402. The control data 401 includes two types of setup commands. One is setup commands for setting a condition for the whole print operation relating to the PDL data such as a command for designating a paper feeding cassette, a command for designating a size of recording sheets, and a command for designating a resolution of an image to be printed in the print operation. The other is setup commands for setting a layout of each page to be printed in the print operation such as a command for designating a region in each page, and a command for designating a reduction factor or a magnification factor (reduction/magnification factor) of an image in each page (hereinafter, referred to as factor designation command).

The object data 402 includes data prescribing text (character object data), data prescribing graphic images (graphic object data), and data prescribing picture images such as photographs (picture object data). The character object data includes a color designation command for designating a color of a character, a font setup command for setting a font of the character, a size designation command for designating a size of the character, a position designation command for designating a start coordinate of a layout position of the character, a spacing designation command for designating a character spacing and a line spacing, text data indicating a character string, and so on.

Figure 5:
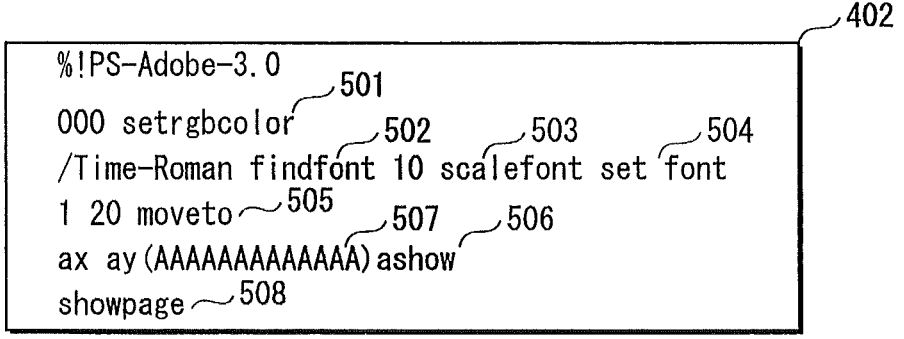
FIG. 5 shows a specific example of character object data described in a PDL.

FIG. 5 shows a specific example of character object data described in the PDL. In the figure, a post script (PS) is used as the PDL. However, the PDL used for describing PDL data is not limited to the PS. Alternatively, PDL data may be described in a portable document format (PDF), a printer control language (PCL), an extensible markup language (XML) paper specification (XPS), or the like.

A command "setrgbcolor" indicated by a reference sign 501 in FIG. 5 is a color designation command for designating a color of text (black color in the figure), and specifically designating a tone value of each of r (red), g (green), and b (blue) colors. Here, the colors are each represented in 256 tones of 0 to 255.

A command "findfont" indicated by a reference sign 502 in FIG. 5 is a font acquisition command for acquiring a font dictionary in which a font is described. A font dictionary identified by a font name "Times-Roman" is acquired here by the font acquisition command. A command "scalefont" indicated by a reference sign 503 in FIG. 5 is a size designation command for designating a character size (font). A character size of 10 point is designated here by the size designation command. A command "set font" indicated by a reference sign 504 in FIG. 5 is a font setup command for setting a font.

A command "moveto" indicated by a reference sign 505 in FIG. 5 is a position designation command for designating start point coordinates of a layout position of a character. A command "ashow" indicated by a reference sign 506 in FIG. 5 is a spacing designation command for designating a character spacing (ax) and a line spacing (ay). A character string in parentheses indicated by a reference sign 507 is described at a character spacing and a line spacing which are designated by the spacing designation command. A command "showpage" indicated by a reference sign 508 in FIG. 5 is a command for instructing to output one-page picture.

Returning to explanation of FIG. 4, the graphic object data includes a command for designating lines constituting graphics with start point coordinates and end point coordinates, a command for designating a thickness of the lines, a command for designating a type of the lines (straight line or curved line), a command for designating a color and filling, and so on. Also, the image object data includes bitmap data representing image data and so on.

Returning to explanation of FIG. 3, the PDL analysis unit 6051 analyzes PDL data to be separated into control data and object data. The PDL analysis unit 6051 outputs the control data to the character object analysis unit 6053 and the bitmap data creation unit 6054 as indicated by dashed arrows, and outputs the object data to the object analysis unit 6052 as indicated by a solid arrow.

The object analysis unit 6052 analyzes each page of the object data which is input from the PDL analysis unit 6051 to judge whether the object data is character object data. When judging that the object data is character object data, the object analysis unit 6052 outputs the character object data to the character object analysis unit 6053 as indicated by a solid arrow. When judging that the object data is not character object data, the object analysis unit 6052 outputs the object data to the bitmap data creation unit 6054 as indicated by a solid arrow.

Judgment as to whether object data is character object data is performed by judging whether the object data includes a command relating to characters such as commands "findfont", "scalefont", "set font", and "ashow" shown in FIG. 5. Also, a page break is identified by the command "showpage".

The character object analysis unit 6053 analyzes commands and text data which are included in the character object data output from the object analysis unit 6052. The character object analysis unit 6053 acquires, as print conditions of the text of the page of the character object data, a character spacing, a line spacing, and a character size which are designated by the commands and a character number of a character string which is indicated by the text data. Also, the character object analysis unit 6053 outputs the character object data to the bitmap data creation unit 6054 as indicated by a solid arrow.

The bitmap data creation unit 6054 creates, as image data for printing, bitmap data corresponding to an image to be formed on a recording sheet, with use of the control data output from the PDL analysis unit 6051 and the object data output from the object analysis unit 6052 and the character object analysis unit 6053.

The image data storage unit 606 stores therein image data for printing. The reference value storage unit 607 stores therein various types of reference values for use in fixing temperature control processing which will be described later, namely a reference character number, a reference character spacing, and a reference line spacing.

The reference character number is equal to the lower limit value of a character number corresponding to an amount of deposited toner that exceeds an amount of toner deposited on a recording sheet for which fixability is ensured if a toner image of text is thermally fixed at the lower limit temperature of a temperature at which thermal fixing is possible. The reference character number corresponding to each character size is stored in the reference value storage unit 607. For example, a value of 1500 is stored as the reference character number corresponding to the character size of 10 point. The reference character number corresponding to each character size is determined for example through tests such as shown below using the printer 1.

With respect to each of a plurality of different character sizes, a print operation is performed by forming toner images of text each having a character number that increases by a predetermined number such as a value of 100 (respective text having a character number of 100, 200, . . . , 2000) on respective recording sheets, and thermally fixing the toner images at the lower limit temperature of the temperature at which thermal fixing is possible.

Then, judgment is made for each character size as to whether fixability of the toner image of the text, which is formed on each of the recording sheet through the print operation, is ensured. As the reference character number corresponding to the character size, the smallest character number is determined from among character numbers each corresponding to an amount of deposited toner that exceeds an amount of deposited toner for which fixability is ensured (that is, fixability is not ensured). The judgment as to whether fixability is ensured is made by checking whether the text after undergoing the print operation is removed.

In the fixing temperature setup processing which will be described later, the character number, which is acquired from each page of the character object data separated from the PDL data, is compared with the reference character number corresponding to the character size acquired from the page. This allows to estimate, before rasterizing process is performed, whether an amount of toner deposited on a recording sheet reaches an amount of deposited toner for which fixability is not ensured if thermal fixing is performed at the lower limit temperature.

When the amount of deposited toner reaches the amount of deposited toner for which fixability is not ensured (when fixability is not ensured), a fixing temperature at which the text of the page to be thermally fixed is set to a target temperature. On the contrary, when the amount of deposited toner does not reach the amount of deposited toner for which fixability is not ensured (when fixability is ensured), the fixing temperature at which the text of the page is to be thermally fixed is set to the lower limit temperature which is lower than the target temperature.

The target temperature is set here such that an excellent fixability is ensured even under print conditions that the largest heat amount for thermally fixing text is necessary, such as print conditions that a printing rate is 5% to 10%. Specifically, the target temperature is for example set to 180 degrees C., and the lower limit temperature is for example set to 160 degrees C. This temperature setting is just one example. The target temperature and the lower limit temperature of course each differ depending on the performance of a printer to be used, toners, and so on.

The reference character spacing and the reference line spacing are respectively equivalent to the upper limit values of a character spacing and a line spacing that exceed a toner deposition density for which fixability is ensured if a toner image of text is thermally fixed at the lower limit temperature of the temperature at which thermal fixing is possible. The reference character spacing corresponds to a toner deposition density in the horizontal direction (X-axis direction in the orthogonal coordinates). The reference line spacing corresponds to a toner deposition density in the vertical direction (Y-axis direction in the orthogonal coordinates).

The reference character spacing is for example zero point, and the reference line spacing is for example one line. The reference character spacing and the reference line spacing are set depending on the performance of a printer to be used. The reference character spacing and the reference line spacing are determined for example through tests shown below using the printer 1.

With respect to character strings having the same character number of characters having the same character size (having a character size of 10 point and a character number of 20 for example), a print operation is performed. Specifically, a toner image of text of each character string is formed on a separate recording sheet in the horizontal direction by changing a character spacing for each character string. Then, the toner images are thermally fixed at the lower limit temperature of the temperature at which thermal fixing is possible.

Then, judgment is made for each character spacing as to whether fixability of the toner image of the text, which is formed on the recording sheet through the print operation, is ensured. As the reference character spacing, the largest character spacing is determined from among character spacings of text of character strings each corresponding to a toner deposition density in the horizontal direction that exceeds a toner deposition density for which fixability is ensured (that is, fixability is not ensured). The reference line spacing is determined in the same manner as the reference character spacing.

In the fixing temperature setup processing which will be described later, a character spacing and a line spacing, which are acquired from each page of the character object data separated from PDL data, are compared with the reference character spacing and the reference line spacing, respectively. This allows to estimate, before rasterizing process is performed, whether a toner deposition density on a recording sheet in the vertical and/or horizontal directions reaches a toner deposition density for which fixability is not secured if thermal fixing is performed at the lower limit temperature.

When the toner deposition density of the page in one of the vertical and horizontal directions reaches the toner deposition density for which fixability is not ensured (when fixability is not ensured), a fixing temperature at which the text of the page to be thermally fixed is set to a target temperature. On the contrary, when the toner deposition density of the page in both of the vertical and horizontal directions does not reach the toner deposition density for which fixability is not ensured (when fixability is ensured), the fixing temperature at which the text of the page to be thermally fixed is set to the lower limit temperature which is lower than the target temperature.

The CPU 601 executes various types of programs stored in the ROM 603 to control the engine control unit 80, the operation panel 6, and so on, and to perform fixing temperature setup processing which will be described later. The control unit 60 and the engine control unit 80 are connected with each other so as to be communicatable with each other. The control unit 60 controls the whole image forming operations via the engine control unit 80.

The operation panel 6 is provided with a plurality of input keys and a liquid crystal display with a touch panel overlaid on a surface thereof. In response to a touch operation on the touch panel or to a key operation on an input key, the operation panel 6 passes a user instruction to the control unit 60.

The engine control unit 80 is a common computer, and controls the image process unit 3, the sheet feeding unit 4, the heater 501 provided in the heating roller 53 of the fixing device 5, the pressure roller driving motor 502, the temperature sensor 503, the image reading unit 7, and so on to control the whole image forming operations.

The image reading unit 7 includes an image input device such as a scanner. The image reading unit 7 reads information such as characters and graphics printed on a recording sheet such as a sheet of paper, and thereby to form image data for printing.

[3] Fixing Temperature Setup Processing

Figure 6:
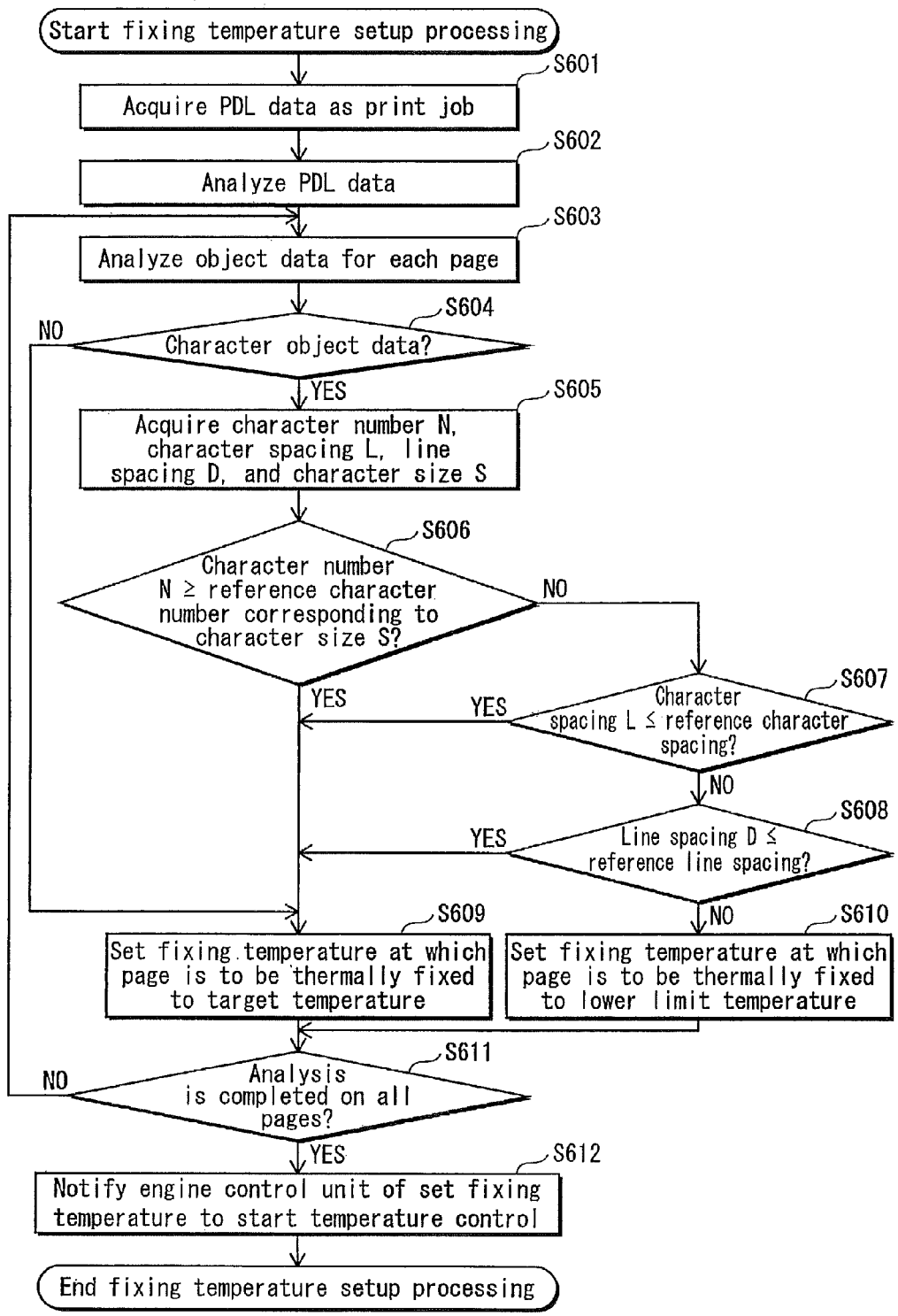
FIG. 6 is a flow chart showing operations of fixing temperature setup processing performed by the control unit 60.

FIG. 6 is a flow chart showing operations of fixing temperature setup processing performed by the control unit 60; The control unit 60 acquires PDL data as a print job via the communication I/F unit 602 (Step S601), analyzes the PDL data to be separated into control data and object data (Step S602). The control unit 60 analyzes each page of the object data (Step S603), and judges whether the object data is character object data (Step S604).

When judging that the object data is character object data (Step S604: YES), the control unit 60 analyzes text data, a spacing designation command, and a size designation command which are included in the character object data, and acquires, as print conditions of text of the page of the character object data, a character number N of a character string that is indicated by the text data, a character spacing L, a line spacing D, and a character size S that are designated by respective commands (Step S605).

Next, the control unit 60 judges whether or not the acquired character number N is equal to or greater than the reference character number, which corresponds to the acquired character size S and is stored in the reference value storage unit 607 (Step S606). The control unit 60 judges whether or not the acquired character spacing L is equal to or less than the reference character spacing, which is stored in the reference value storage unit 607 (Step S607). The control unit 60 judges whether or not the acquired line spacing D is equal to or less than the reference line spacing, which is stored in the reference value storage unit 607 (Step S608). Through these judgments in Steps S606, S607, and S608, the control unit 60 judges whether fixability is ensured if the text of the page of the character object data is thermally fixed at a lower limit temperature that is lower than a target temperature.

Specifically, when judging affirmatively in each of Steps S606, S607, and S608, the control unit 60 judges that fixability is not ensured. On the contrary, when judging negatively in each of Steps S606, S607, and S608, the control unit 60 judges that fixability is ensured.

When judging affirmatively (when judging that fixability is not ensured) in at least one of Steps S606, S607, and S608 (Step S606: YES), (Step S607: YES), and/or (Step S608: YES), the control unit 60 sets a fixing temperature at which the text of the page of the character object data is to be thermally fixed to the target temperature (Step S609).

On the contrary, when judging negatively (when judging that fixability is ensured) in all of Steps S606, S607, and S608 (Step S606: NO), (Step S607: NO), and (Step S608: NO), the control unit 60 sets the fixing temperature to the lower limit temperature which is lower than the target temperature (Step S610).

Then, when completing analysis on all of the pages of the object data (Step S611: YES), the control unit 60 notifies the engine control unit 80 of the fixing temperature of the text of each page of the character object data to control the engine control unit 80 to start controlling the surface temperature of the fixing belt 52 (Step S612).

The engine control unit 80 controls the surface temperature of the fixing belt 52 such that the fixing temperature of the text of each page of the character object data is equal to the fixing temperature set for the page by the control unit 60. The engine control unit 80 thermally fixes the text of the page of the character object data at the fixing temperature set for the page by the control unit 60.

On the contrary, when judging negatively in Step S604 (Step S604: NO), the control unit 60 moves onto Step S609.

Note that an image of each page of object data other than character object data, such as a picture image, might be greater than text in terms of amount of deposited toner. For this reason, a fixing temperature of such an image of each page of object data other than character object data may be set to a predetermined temperature of for example 190 degrees C. that is higher than the target temperature. In other words, when judging negatively in Step S604 (Step S604: NO), the control unit 60 may set the fixing temperature to a predetermined temperature that is higher than the target temperature.

Also, in Step S604, in the case where the object data prescribes a character and an image other than the character within one page, the control unit 60 judges that the object data is not character object data, and moves on Step S609.

According to the present embodiment as described above, information is acquired, from PDL data, which include the character number, the character spacing, the line spacing, and the character size which prescribe the print conditions of the text of each page to be printed on a recording sheet. Then, with use of the acquired information, judgment is made as to whether fixability is ensured if the text of the page is thermally fixed at the lower limit temperature which is lower than the target temperature.

As a result, it is possible to judge, before rasterizing process is performed, whether fixability is ensured if the text of the page is thermally fixed at the lower limit temperature which is lower than the target temperature. This allows to realize both ensuring of fixability and prompt setting of the fixing temperature for power consumption reduction to start controlling the fixing temperature, based on results of the judgment. Therefore, since control on the fixing temperature is started earlier, the print operation is accordingly started earlier, and thereby to prevent decrease in productivity of the print operation.

(Modifications)

Up to this point, the present invention has been described by way of the above embodiment. However, it should be naturally appreciated that the present invention is not limited to the specific embodiment and various modifications including the following may be made.

(1) In the fixing temperature setup processing according to the above embodiment, a character number, a character spacing, and a line spacing, which are acquired from PDL data, are used for making judgment as to whether fixability is ensured if text of a page of character object data is thermally fixed at the lower limit temperature which is lower than the target temperature. Alternatively, a character size, which is also acquired from the PDL data, may be used for making the judgment, in addition to the acquired character number, character spacing, and line spacing.

This is because of the following two reasons. First, an amount of deposited toner per character increases depending on the character size, and this causes difference in fixability of the text between the character sizes if thermal fixing is performed at the lower limit temperature which is lower than the target temperature. Second, the more the character size increases, the more noticeable to a user the change in image quality of the text due to fixing failure is.

The reference character size, which is used as the reference value for making the judgment using the character size as to whether fixability is ensured, is equal to the lower limit of the character size for which fixability is not ensured if a toner image of text is thermally fixed at the lower limit temperature of the temperature at which thermal fixing is possible. This reference character size is determined as follows. A print operation is performed by forming toner images of text each having a different character size on respective recording sheets, and thermally fixing the tone images at the lower limit temperature of the temperature at which thermal fixing is possible.

Then, judgment is made as to whether fixability of the toner image of the text, which is formed on each of the recording sheets through the print operation, is ensured. As the reference character size, the smallest character size is determined from among character sizes of the text for which fixability is not ensured.

Figure 7:
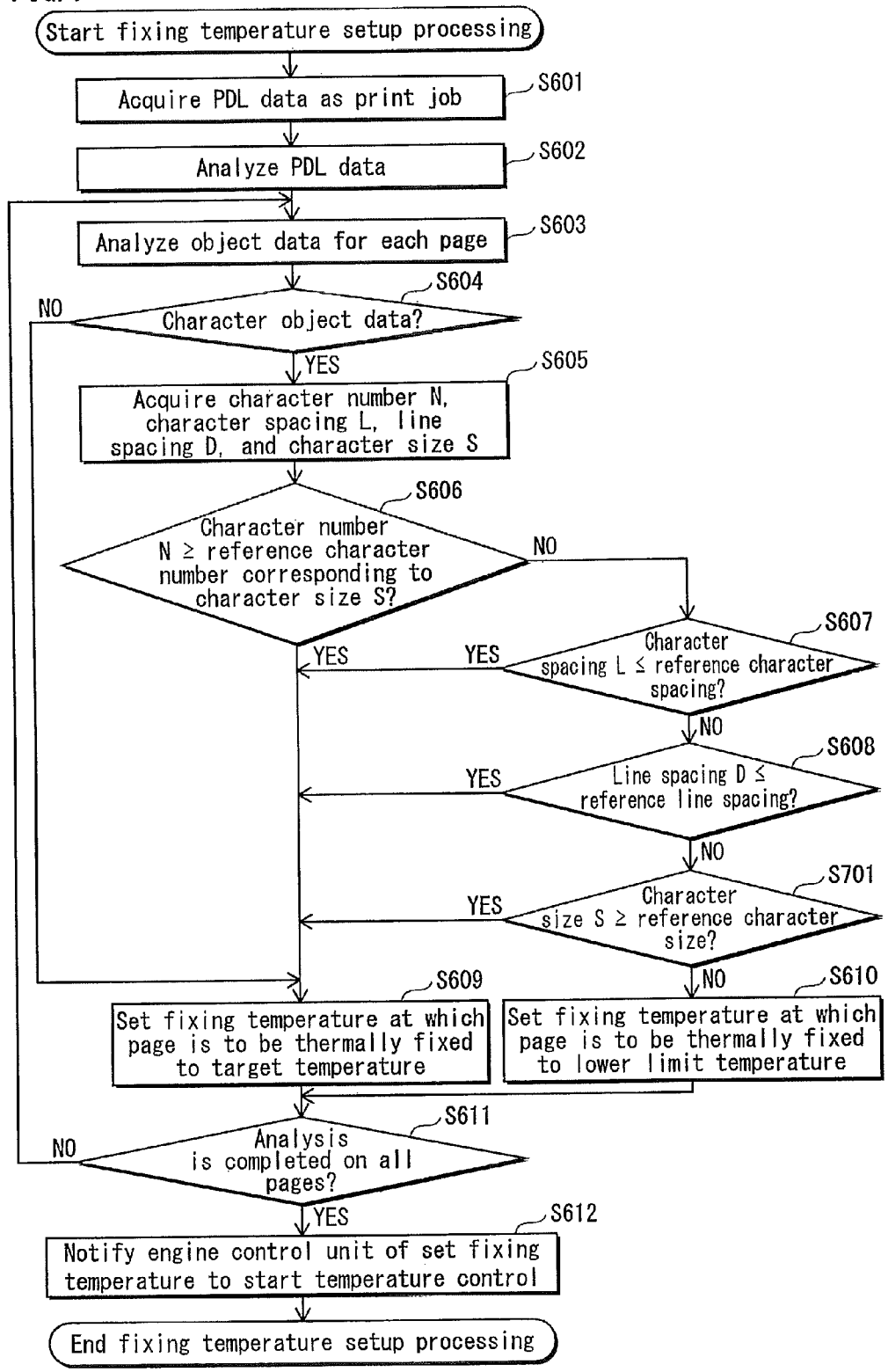
FIG. 7 is a flow chart showing a first modification of the operations of the fixing temperature setup processing performed by the control unit 60.

FIG. 7 is a flow chart showing a modification of the operations of the fixing temperature setup processing performed by the control unit 60 using the reference character size determined such as described above (first modification). In the figure, the same steps as those of the fixing temperature setup processing shown in FIG. 6 are denoted by the same step numbers, and description thereof is omitted. The following describes the differences from the fixing temperature setup processing shown in FIG. 6.

When judging negatively in all of Steps S606, S607, and S608 (Step S606: NO), (Step S607: NO), and Step (S608: NO), the control unit 60 judges whether or not the character size S acquired in Step S605 is equal to or greater than the reference character size of 11 point here for example, and thereby to judge whether fixability is ensured if text of a page of character object data is thermally fixed at the lower limit temperature which is lower than the target temperature (Step S701).

Specifically, when judging that the character size S is equal to or greater than the reference character size (Step S701: YES), the control unit 60 judges that fixability is not ensured. On the contrary, when judging that the character size S is less than the reference character size (Step S701: NO), the control unit 60 judges that fixability is ensured.

When judging affirmatively in at least one of Steps S606, S607, S608, and S701 (Step S606: YES), (Step S607: YES), (Step S608: YES), and/or (Step S701: YES), the control unit 60 sets the fixing temperature at which the text of the page of the character object data is to be thermally fixing to the target temperature (Step S609).

On the contrary, when judging negatively in all of Steps S606, S607, S608, and S701 (Step S606: NO), (Step S607: NO), (Step S608: NO), and (Step S701: NO), the control unit 60 sets the fixing temperature to the lower limit temperature which is lower than the target temperature (Step S610).

(2) In the fixing temperature setup processing according to the above embodiment, there is no consideration for the case where text of a page of character object data is text including halftone. Generally, in the case where text of a page of character object data includes halftone, most of toner is deposited on recording sheets as small separated dots. This makes it difficult to ensure fixability compared with the case where text does not include halftone. For this reason, in the case where text of a page of character object data includes halftone, control may be performed to set the fixing temperature to the target temperature in order to ensure fixability.

Figure 8:
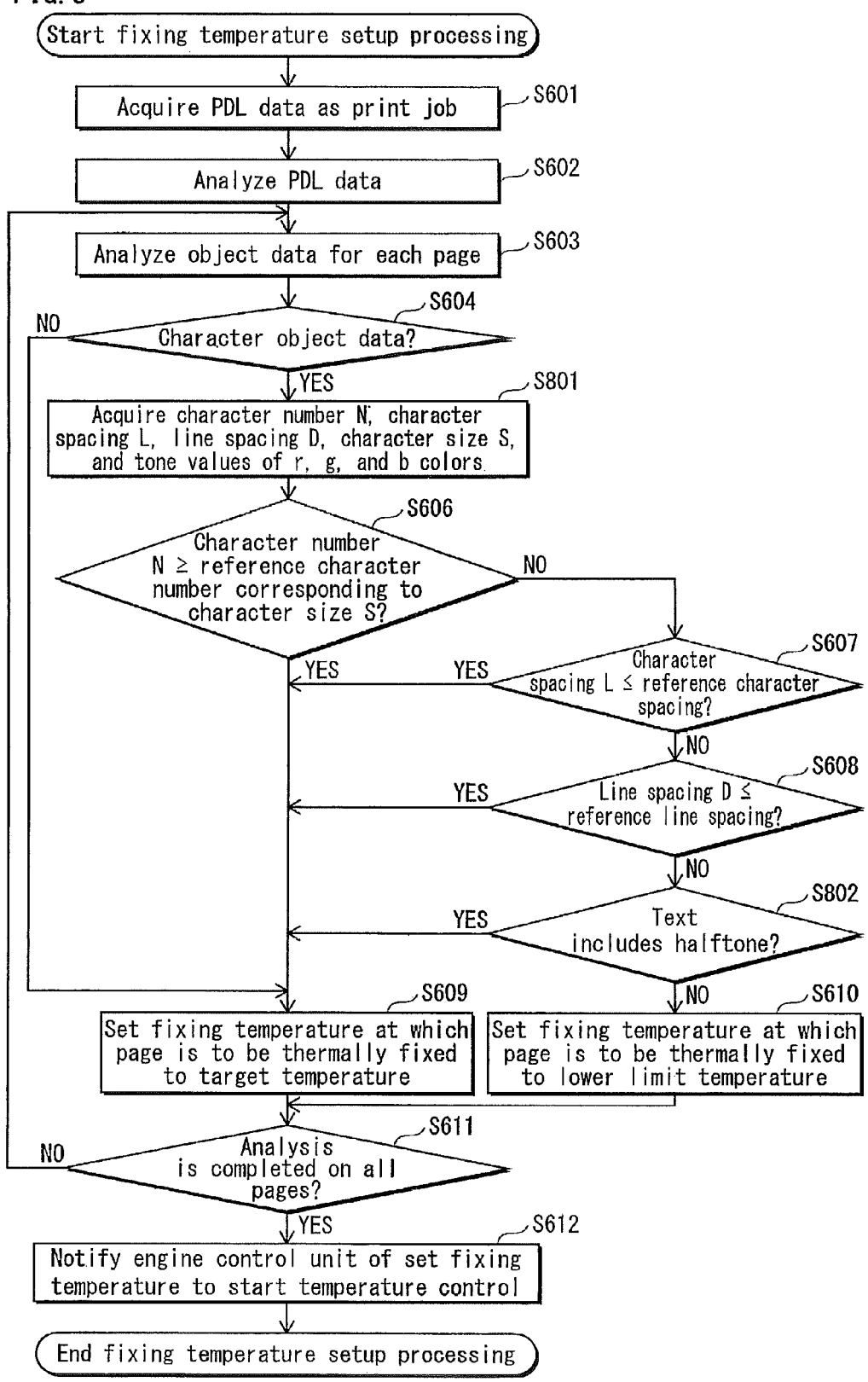
FIG. 8 is a flow chart showing a second modification of the operations of the fixing temperature setup processing performed by the control unit 60.

FIG. 8 is a flow chart showing a modification of the operations of the fixing temperature setup processing performed by the control unit 60 including the control described above (second modification). In the figure, the same steps as those of the fixing temperature setup processing shown in FIG. 6 are denoted by the same step numbers, and description thereof is omitted. The following describes the differences from the fixing temperature setup processing shown in FIG. 6.

When judging affirmatively in Step S604 (Step S604: YES), the control unit 60 analyzes the text data, the spacing designation command, the size designation command, and the color designation command, which are included in the character object data, and acquires, as print conditions of the page of the character object data, the character number N of the character string indicated by text data, the character spacing L, the line spacing D, the character size S, and respective tone values of r, g, and b colors (Step S801).

Furthermore, when judging negatively in all of Steps S606, S607, and S608 (Step S606: NO), (Step S607: NO), and Step (S608: NO), the control unit 60 judges whether the text of the page of the character object data includes halftone based on the respective tone values of the r, g, and b colors acquired in Step S801 (Step S802). Specifically, when the respective tone values of the r, g, and b colors are all 0 or all 255, the control unit 60 judges that the text does not include halftone. On the contrary, when the respective tone values of the r, g, and b colors are not all 0 or not all 255, the control unit 60 judges that the text includes halftone.

When judging that the text includes halftone, the control unit 60 judges that fixability is not ensured if the text of the page of the character object data is thermally fixed at the lower limit temperature which is lower than the target temperature. On the contrary, when judging that the text does not include halftone, the control unit 60 judges that fixability is ensured.

When judging affirmatively in at least one of Steps S606, S607, S608, and S802 (Step S606: YES), (Step S607: YES), (Step S608: YES), and/or (Step S802: YES), the control unit 60 sets the fixing temperature at which the text of the page of the character object data is to be thermally fixing to the target temperature (Step S609).

On the contrary, when judging negatively in all of Steps S606, S607, S608, and S802 (Step S606: NO), (Step S607: NO), (Step S608: NO), and (Step S802: NO), the control unit 60 sets the fixing temperature to the lower limit temperature which is lower than the target temperature (Step S610). Note that the second modification is applicable to the first modification. Specifically, the second modification is applicable to the first modification by modifying the flow chart in FIG. 7 such that the processing of Step S801 is performed instead of the processing of Step S605 in FIG. 7, and the processing of Step S802 is performed subsequent to the processing of Step S701 in FIG. 7.

This prevents occurrence of fixing failure due to that the text of the page of the character object data which includes halftone is thermally fixed at the lower limit temperature which is lower than the target temperature.

(3) In the fixing temperature setup processing according to the first modification, a reduction/magnification factor of an image of each page is not taken into consideration. Alternatively, in the case where the reduction/magnification factor of an image of each page is designated, the fixing temperature setup processing may be performed taking into consideration the reduction/magnification factor of the image of the page.

In the present modification, the character object analysis unit 6053 analyzes the factor designation command that is included in control data input from the PDL analysis unit 6051 to acquire a reduction/magnification factor designated by the factor designation command. Here, the reduction/magnification factor is designated in percentage, the reduction factor is designated in value less than 100, and the magnification factor is designated in value greater than 100. The reduction/magnification factor designated in value of 100 indicates an equal magnification.

Then, with respect to the character size, the character spacing, and the line spacing, which are acquired by analyzing the commands included in the character object data, the character object analysis unit 6053 calculates the character size, the character spacing, and the line spacing after reduction/magnification using the acquired reduction/magnification factor.

Figure 9:
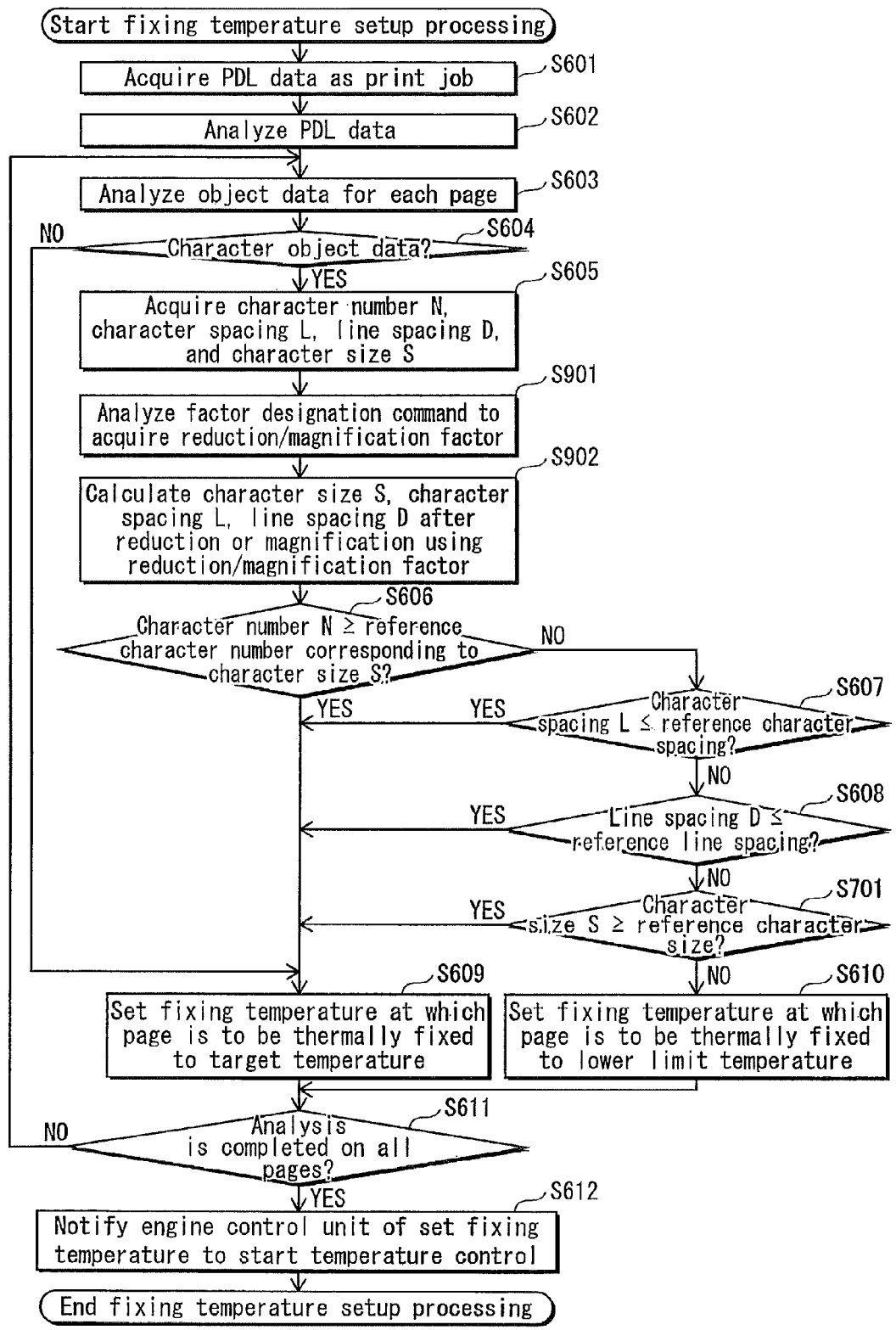
FIG. 9 is a flow chart showing a third modification of the operations of the fixing temperature setup processing performed by the control unit 60.

FIG. 9 is a flow chart showing a modification of the operations of the fixing temperature setup processing performed by the control unit 60 (third modification). In the figure, the same steps as those of the fixing temperature setup processing shown in FIG. 6 are denoted by the same step numbers, and description thereof is omitted. The following describes the differences from the fixing temperature setup processing shown in FIG. 6.

After performing the processing of Step S605, the control unit 60 analyzes the factor designation command included in the control data to acquire a reduction/magnification factor designated by the factor designation command (Step S901).

Then, the control unit 60 calculates the character size S, the character spacing L, and the line spacing D after reduction or magnification, using the acquired reduction/magnification factor (Step S902). In the case where the reduction factor of 90% is designated by the factor designation command for example, the control unit 60 calculates the character size S, the character spacing L, and the line spacing D after reduction, by multiplying each of the character size S, the character spacing L, and the line spacing D, which are acquired in Step S605, by 0.9. Also, in the case where the magnification factor of 110% is designated by the factor designation command for example, the control unit 60 calculates the character size S, the character spacing L, and the line spacing D after magnification, by multiplying each of the character size S, the character spacing L, and the line spacing D, which are acquired in Step S605, by 1.1.

Then, the control unit 60 performs processing of Steps S606 and S701 using the character size S which is calculated in Step S902. The control unit 60 performs processing of Step S607 using the character spacing L which is calculated in Step S902. The control unit 60 performs processing of Step S608 using the line spacing D which is calculated in Step S902.

In this way, in the case where a reduction/magnification factor of text is prescribed in PDL data, judgment is made as to whether fixability is ensured by comparing the character size, the character spacing, and/or the line spacing that is reduced or magnified by the reduction/magnification factor with the reference value for judgment. Therefore, even in the case a toner image of text after reduction or magnification is formed on a recording sheet, it is possible to judge whether fixability is ensured with further accuracy, and thereby to appropriately set the fixing temperature based on results of the judgment.

Note that the second modification is applicable to the third modification. Specifically, the flow chart in FIG. 9 may be modified such that the processing of Step S801 is performed instead of the processing of Step S605 in FIG. 9, and the processing of Step S802 is performed subsequent to the processing of Step S701 in FIG. 9.

Figure 10:
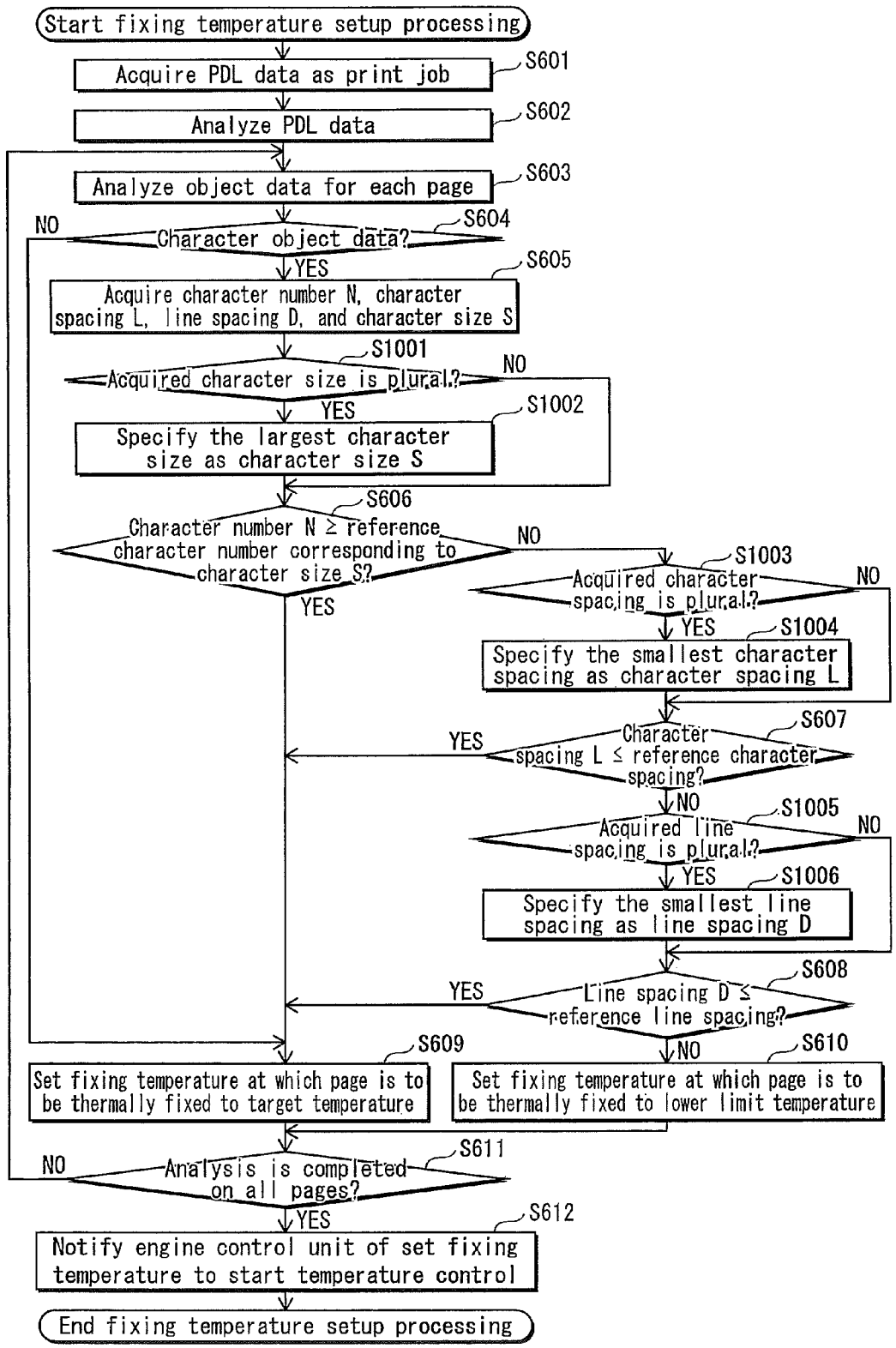
FIG. 10 is a flow chart showing a fourth modification the operations of the fixing temperature setup processing performed by the control unit 60.

(4) In the fixing temperature setup processing according to the above embodiment, assumption is made that a character spacing, a line spacing, and a character size to be designated for each page of character object data are each one. Alternatively, the character spacing, the line spacing, and the character size to be designated may be each plural. FIG. 10 is a flow chart showing a modification of the operations of the fixing temperature setup processing in the above case (fourth modification).

In the figure, the same steps as those of the fixing temperature setup processing shown in FIG. 6 are denoted by the same step numbers, and description thereof is omitted. The following describes the differences from the fixing temperature setup processing shown in FIG. 6.

When acquiring a plurality of different types of character sizes as the print conditions in Step S605 (Step S1001: YES), the control unit 60 specifies a largest one of the acquired character sizes (Step S1002), and makes the judgment in Step S606 using the specified character size as the character size S for use in the judgment in Step S606.

Furthermore, when judging negatively in Step S606 (Step S606: NO) and acquiring a plurality of different types of character spacings as a print condition in Step S605 (Step S1003: YES), the control unit 60 specifies a smallest one of the acquired character spacings (Step S1004), and makes the judgment in Step S607 using the specified character spacing as the character spacing L for use in comparison with the reference character spacing.

Moreover, when judging negatively in Step S607 (Step S607: NO) and acquiring a plurality of different types of line spacings as the print conditions in Step S605 (Step S1005: YES), the control unit 60 specifies a smallest one of the acquired line spacings (Step S1006), and makes the judgment in Step S608 using the specified line spacing as the line spacing D for use in comparison with the reference line spacing.

In this way, the case where a plurality of different character spacings, a plurality of different line spacings, and/or a plurality of different character sizes are prescribed in PDL data as print conditions, judgment is made as to whether fixability is ensured using one of the character spacings, one of the line spacings, and/or one of the character sizes for which fixability is the most difficult to be ensured. Accordingly, it is possible to judge whether fixability is ensured with further accuracy, and thereby to appropriately set the fixing temperature based on results of the judgment.

In other words, in the case where judgment is made as to whether fixability is ensured using the character spacing, the line spacing, and/or the character size that is other than the character spacing, the line spacing, and/or the character size for which fixability is the most difficult to be ensured, fixability might not be ensured with respect to the character spacing, the line spacing, for which fixability is the most difficult to be ensured even if results of the judgment are affirmative with respect to the character spacing, the line spacing, and/or the character size that is other than the character spacing, the line spacing, and/or the character size for which fixability is the most difficult to be ensured. This causes a failure that despite fixability is not ensured, the fixing temperature is set to the lower limit temperature which is lower than the target temperature. Compared with this, in the case where judgment is made as to whether fixability is ensured using the character spacing, the line spacing, and/or the character size for which fixability is the most difficult to be ensured, such a failure is not caused.

Figure 11:
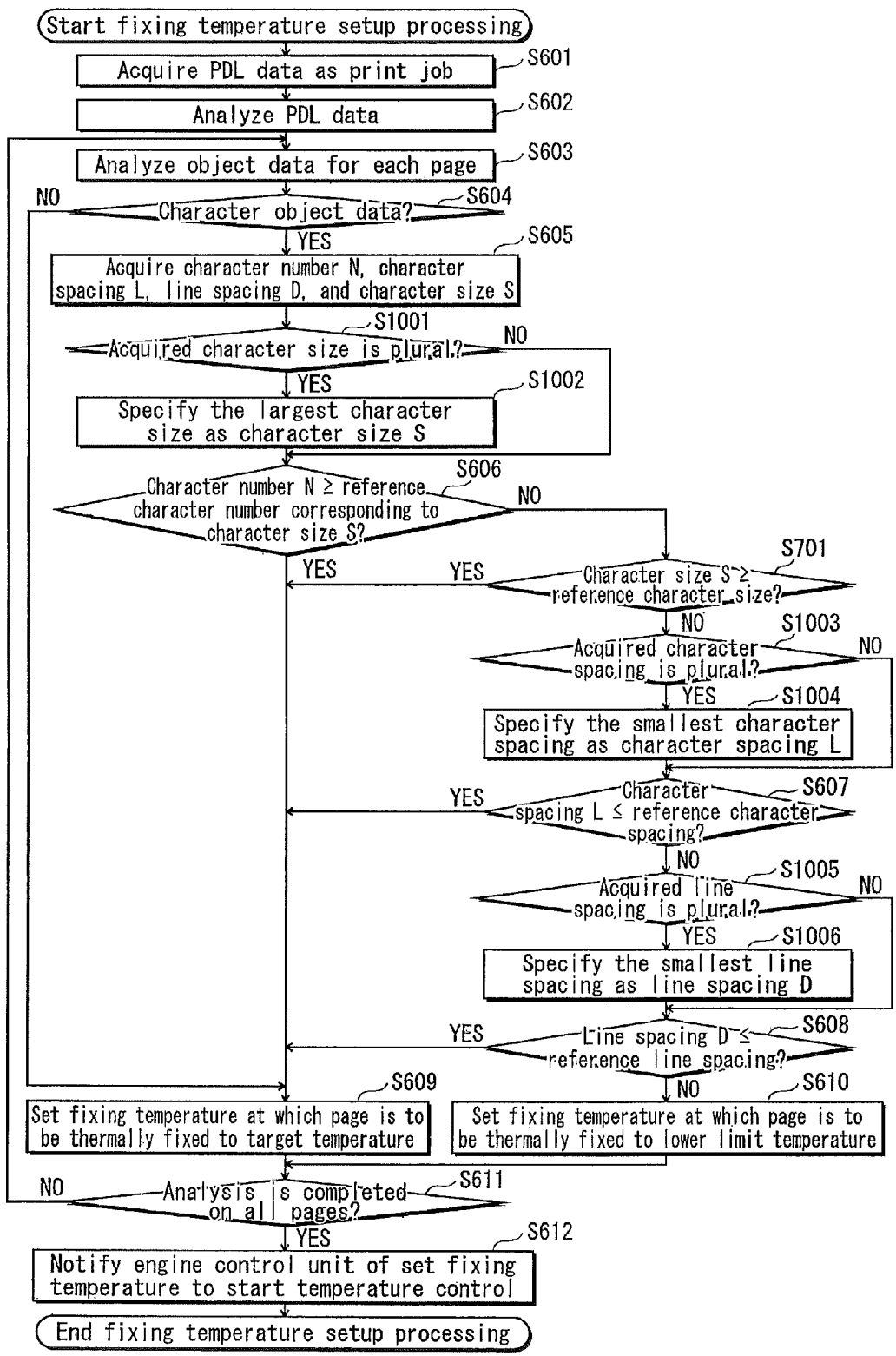
FIG. 11 is a flow chart showing a fifth modification of the operations of the fixing temperature setup processing performed by the control unit 60.

Also, the present modification is applicable to the first modification. Specifically, the fourth modification in FIG. 10 may be modified such as shown in FIG. 11 (fifth modification). When judging negatively in Step S606 (Step S606: NO), the control unit 60 performs the processing of Step S701 in FIG. 7 using the largest character size S which is specified in Step S1002. When judging affirmatively in Step S701 (Step S701: YES), the control unit 60 may move on Step S609. When judging negatively in Step S701 (Step S701: NO), the control unit 60 may move on Step S1003.

(5) In the fixing temperature setup processing according to the above embodiment, a character number, a character spacing, and a line spacing, which are acquired from PDL data, are used for judging whether fixability is ensured if text of a page of character object data is thermally fixed at the lower limit temperature which is lower than the target temperature. Alternatively, at least one of the character number, the character spacing, and the line spacing may be used for making the judgment, instead of using all of the character number, the character spacing, and the line spacing.

In this case, though the application range in the text is narrow compared with in the above embodiment, it possible to set the fixing temperature at which the text of the page of the character object data is to be thermally fixed, in the same manner as in the above embodiment, and thereby to achieve the same effects as in the above embodiment.

(6) In the fixing temperature setup processing according to the above embodiment, the fixing temperature at which a toner image of text is to be thermally fixed is switched between the target temperature (temperature at which an excellent fixability is ensured even under print conditions that the largest heat amount for thermally fixing the text is necessary) and the lower limit temperature of the temperature at which thermal fixing is possible. However, the fixing temperature may be switched between temperatures other than the target temperature and the lower limit temperature.

Alternatively, the two temperatures between which the fixing temperature is to be switched may be set such that one is higher than the lower limit temperature and is lower than the target temperature, and the other is equal to or higher than the lower limit temperature.

<Conclusion>

The one aspect of the present invention, which has been disclosed above, provides an image forming apparatus that forms a toner image of text on a recording sheet based on page description language (PDL) data, and thermally fixes the toner image, the PDL data prescribing text data and one or more print conditions of the text data, the image forming apparatus comprising: a condition acquisition unit that analyzes the PDL data to acquire, as the print conditions, one or more of a character number, a character spacing, and a line spacing from the PDL data; a judgment unit that makes a judgment for each of the acquired print conditions, by comparing the acquired print condition with a reference value corresponding to the acquired print condition, the judgment indicating whether the acquired print condition is suitable for ensuring fixability of the toner image if the toner image is thermally fixed at a temperature that is lower than a predetermined temperature; and a temperature control unit that, when the judgment unit judges negatively with respect to at least one of the acquired print conditions, sets a fixing temperature at which the toner image is to be thermally fixed to the predetermined temperature, and when the judgment unit judges affirmatively with respect to all of the acquired print conditions, sets the fixing temperature to the temperature that is lower than the predetermined temperature.

Also, a computer-readable recording medium non-transitorily has recorded therein a temperature control program for causing the image forming apparatus relating to the one aspect of the present invention to perform temperature control processing, the image forming apparatus forming a toner image of text on a recording sheet based on page description language (PDL) data, and thermally fixing the toner image, the PDL data prescribing text data and one or more print conditions of the text data, the image temperature control processing comprising: a condition acquisition step of analyzing the PDL data to acquire, as the print conditions, one or more of a character number, a character spacing, and a line spacing from the PDL data; a judgment step of making a judgment for each of the acquired print conditions, by comparing the acquired print condition with a reference value corresponding to the acquired print condition, the judgment indicating whether the acquired print condition is suitable for ensuring fixability of the toner image if the toner image is thermally fixed at a temperature that is lower than a predetermined temperature; and a temperature control step of, when the judgment step judges negatively with respect to at least one of the acquired print conditions, setting a fixing temperature at which the toner image is to be thermally fixed to the predetermined temperature, and when the judgment step judges affirmatively with respect to all of the acquired print conditions, setting the fixing temperature to the temperature that is lower than the predetermined temperature.

Also, a temperature control method for use in the image forming apparatus relating to the one aspect of the present invention that forms a toner image of text on a recording sheet based on page description language (PDL) data, and thermally fixes the toner image, the PDL data prescribing text data and one or more print conditions of the text data, the image temperature control method comprising: a condition acquisition step of analyzing the PDL data to acquire, as the print conditions, one or more of a character number, a character spacing, and a line spacing from the PDL data; a judgment step of making a judgment for each of the acquired print conditions, by comparing the acquired print condition with a reference value corresponding to the acquired print condition, the judgment indicating whether the acquired print condition is suitable for ensuring fixability of the toner image if the toner image is thermally fixed at a temperature that is lower than a predetermined temperature; and a temperature control step of, when the judgment step judges negatively with respect to at least one of the acquired print conditions, setting a fixing temperature at which the toner image is to be thermally fixed to the predetermined temperature, and when the judgment step judges affirmatively with respect to all of the acquired print conditions, setting the fixing temperature to the temperature that is lower than the predetermined temperature.

Here, in the case where the character number is acquired as one of the print conditions, when the acquired character number is less than the reference value corresponding to character number, the judgment unit judges affirmatively, when the acquired character number is equal to or greater than the reference value corresponding to character number, the judgment unit judges negatively, in the case where the character spacing is acquired as one of the print conditions, when the acquired character spacing is greater than the reference value corresponding to character spacing, the judgment unit judges affirmatively, when the acquired character spacing is equal to or less than the reference value corresponding to character spacing, the judgment unit judges negatively, and in the case where the line spacing is acquired as one of the print conditions, when the acquired line spacing is greater than the reference value corresponding to line spacing, the judgment unit judges affirmatively, and when the acquired line spacing is equal to or less than the reference value corresponding to line spacing, the judgment unit judges negatively.

Alternatively, in the case where the character number is acquired as one of the print conditions, when the acquired character number is less than the reference value corresponding to character number, the judgment step judges affirmatively, when the acquired character number is equal to or greater than the reference value corresponding to character number, the judgment step judges negatively, in the case where the character spacing is acquired as one of the print conditions, when the acquired character spacing is greater than the reference value corresponding to character spacing, the judgment step judges affirmatively, when the acquired character spacing is equal to or less than the reference value corresponding to character spacing, the judgment step judges negatively, in the case where the line spacing is acquired as one of the print conditions, and when the acquired line spacing is greater than the reference value corresponding to line spacing, the judgment step judges affirmatively, and when the acquired line spacing is equal to or less than the reference value corresponding to line spacing, the judgment step judges negatively.

Also, the condition acquisition unit further acquires, as one of the print conditions, a character size from the PDL data, when the acquired character size is less than the reference value corresponding to character size, the judgment unit judges affirmatively, and when the acquired character size is equal to or greater than the reference value corresponding to character size, the judgment unit judges negatively.

Alternatively, the condition acquisition step further acquires, as one of the print conditions, a character size from the PDL data, when the acquired character size is less than the reference value corresponding to character size, the judgment step judges affirmatively, and when the acquired character size is equal to or greater than the reference value corresponding to character size, the judgment step judges negatively.

Also, the condition acquisition unit further acquires, as one of the print conditions, halftone information from the PDL data, the halftone information indicating whether the text data is data of text including halftone, when the acquired halftone information indicates that the text data is not data of text including halftone, the judgment unit judges affirmatively, and when the acquired halftone information indicates that the text data is data of text including halftone, the judgment unit judges negatively.

Alternatively, the condition acquisition step further acquires, as one of the print conditions, halftone information from the PDL data, the halftone information indicating whether the text data is data of text including halftone, when the acquired halftone information indicates that the text data is not data of text including halftone, the judgment step judges affirmatively, and when the acquired halftone information indicates that the text data is data of text including halftone, the judgment step judges negatively.

Also, the reference value corresponding to character number is determined in correspondence with a character size such that the reference value corresponding to character number decreases as the character size increases, the condition acquisition unit further acquires, as one of the print conditions, the character size from the PDL data, when the acquired character number is less than the reference value corresponding to character number, which is determined in correspondence with the acquired character size, the judgment unit judges affirmatively, and when the acquired character number is equal to or greater than the reference value corresponding to character number, which is determined in correspondence with the acquired character size, the judgment unit judges negatively.

Alternatively, the reference value corresponding to character number is determined in correspondence with a character size such that the reference value corresponding to character number decreases as the character size increases, the condition acquisition step further acquires, as one of the print conditions, the character size from the PDL data, when the acquired character number is less than the reference value corresponding to character number, which is determined in correspondence with the acquired character size, the judgment step judges affirmatively, and when the acquired character number is equal to or greater than the reference value corresponding to character number, which is determined in correspondence with the acquired character size, the judgment step judges negatively.

With the above structure, one or more of a character number, a character spacing, and a line spacing are acquired from PDL data prescribing text data and one or more print conditions of the text data, as the print conditions. A judgment is made for each of the acquired print conditions, by comparing the acquired print condition with a reference value corresponding to the acquired print condition, and the judgment indicates whether the acquired print condition is suitable for ensuring fixability of the toner image if the toner image is thermally fixed at a temperature that is lower than a predetermined temperature. As a result, it is possible to judge, before rasterizing process is performed, whether fixability is ensured if the toner image of the text is thermally fixed at the lower limit temperature which is lower than the predetermined temperature. This allows to realize both ensuring of fixability and prompt setting of the fixing temperature for power consumption reduction to start controlling the fixing temperature, based on results of the judgments. Therefore, since control on the fixing temperature is started earlier, the print operation is accordingly started earlier, and thereby to prevent decrease in productivity of the print operation.

Here, the condition acquisition unit further acquires a reduction factor or a magnification factor of the text from the PDL data, when the acquired character spacing after reduction by the reduction factor or magnification by the magnification factor is greater than the reference value corresponding to character spacing, the judgment unit judges affirmatively, and when the acquired character spacing after reduction by the reduction factor or magnification by the magnification factor is equal to or less than the reference value corresponding to character spacing, the judgment unit judges negatively.

Alternatively, the condition acquisition step further acquires a reduction factor or a magnification factor of the text from the PDL data, when the acquired character spacing after reduction by the reduction factor or magnification by the magnification factor is greater than the reference value corresponding to character spacing, the judgment step judges affirmatively, and when the acquired character spacing after reduction by the reduction factor or magnification by the magnification factor is equal to or less than the reference value corresponding to character spacing, the judgment step judges negatively.

Also, the condition acquisition unit further acquires a reduction factor or a magnification factor of the text from the PDL data, when the acquired line spacing after reduction by the reduction factor or magnification by the magnification factor is greater than the reference value corresponding to line spacing, the judgment unit judges affirmatively, and when the acquired line spacing after reduction by the reduction factor or magnification by the magnification factor is equal to or less than the reference value corresponding to line spacing, the judgment unit judges negatively.

Alternatively, the condition acquisition step further acquires a reduction factor or a magnification factor of the text from the PDL data, when the acquired line spacing after reduction by the reduction factor or magnification by the magnification factor is greater than the reference value corresponding to line spacing, the judgment step judges affirmatively, and when the acquired line spacing after reduction by the reduction factor or magnification by the magnification factor is equal to or less than the reference value corresponding to line spacing, the judgment step judges negatively.

Also, the condition acquisition unit further acquires a reduction factor or a magnification factor of the text from the PDL data, when the acquired character number after reduction by the reduction factor or magnification by the magnification factor is less than the reference value corresponding to character number, the judgment unit judges affirmatively, and when the acquired character number after reduction by the reduction factor or magnification by the magnification factor is equal to or greater than the reference value corresponding to character number, the judgment unit judges negatively.

Alternatively, the condition acquisition step further acquires a reduction factor or a magnification factor of the text from the PDL data, when the acquired character number after reduction by the reduction factor or magnification by the magnification factor is less than the reference value corresponding to character number, the judgment step judges affirmatively, and when the acquired character number after reduction by the reduction factor or magnification by the magnification factor is equal to or greater than the reference value corresponding to character number, the judgment step judges negatively.

Also, the condition acquisition unit further acquires a reduction factor or a magnification factor of the text from the PDL data, when the acquired character size after reduction by the reduction factor or magnification by the magnification factor is less than the reference value corresponding to character size, the judgment unit judges affirmatively, and when the acquired character size after reduction by the reduction factor or magnification by the magnification factor is equal to or greater than the reference value corresponding to character size, the judgment unit judges negatively.

Alternatively, the condition acquisition step further acquires a reduction factor or a magnification factor of the text from the PDL data, when the acquired character size after reduction by the reduction factor or magnification by the magnification factor is less than the reference value corresponding to character size, the judgment step judges affirmatively, and when the acquired character size after reduction by the reduction factor or magnification by the magnification factor is equal to or greater than the reference value corresponding to character size, the judgment step judges negatively.

With this structure, in the case where a reduction factor or a magnification factor of the text is acquired from the PDL data, a judgment is made as to whether fixability is ensured, by comparing at least one of the character spacing, the line spacing, and the character spacing with the reference value corresponding thereto. Accordingly, even in the case where text after reduction by the reduction factor or magnification by the magnification factor is formed on a recording sheet, it is possible to judge whether fixability is ensured with further accuracy, and thereby to appropriately set the fixing temperature based on results of the judgment.

Here, in the case where the condition acquisition unit acquires, as one of the print conditions, a plurality of different character spacings from the PDL data, when a smallest one of the acquired different character spacings is greater than the reference value corresponding to character spacing, the judgment unit judges affirmatively, and when the smallest character spacing is equal to or less than the reference value corresponding to character spacing, the judgment unit judges negatively.

Alternatively, in the case where the condition acquisition step acquires, as one of the print conditions, a plurality of different character spacings from the PDL data, when a smallest one of the acquired different character spacings is greater than the reference value corresponding to character spacing, the judgment step judges affirmatively, and when the smallest character spacing is equal to or less than the reference value corresponding to character spacing, the judgment step judges negatively.

With this structure, in the case where a plurality of different character spacings are acquired from the PDL data as one of the print conditions, a comparison is made between a smallest one of the acquired different character spacings that corresponds to the highest toner deposition density and a reference value corresponding to character spacing. When the smallest character spacing is greater than the reference value corresponding to character spacing, it is judged that fixability of the toner image is ensured if the toner image is thermally fixed at the temperature that is lower than the predetermined temperature. When the smallest character spacing is equal to or less than the reference value corresponding to character spacing, it is judged that fixability of the toner image is not ensured if the toner image is thermally fixed at the temperature that is lower than the predetermined temperature. Therefore, it is possible to make a judgment with respect to one of the acquired different character spacings for which fixability is most difficult to ensure.

As a result, compared with the case where a judgment is made with use of any of the character spacings other than the smallest character spacing, it is possible to judge whether fixability is ensured with further accuracy, and thereby to appropriately set the fixing temperature based on results of the judgment.

In other words, in the case where a judgment is made as to whether fixability is ensured using any of the character spacings other than the smallest character spacing, fixability might not be ensured with respect to the smallest character spacing even if results of the judgment are affirmative with respect to the any of the character spacings other than the smallest character spacing. This causes a failure that despite fixability is not ensured, the fixing temperature is set to the lower limit temperature that is lower than the predetermined temperature. Compared with this, in the case where a judgment is made as to whether fixability is ensured using the smallest character spacing, such a failure is not caused.

Here, in the case where the condition acquisition unit acquires, as one of the print conditions, a plurality of different line spacings from the PDL data, when a smallest one of the acquired different line spacings is greater than the reference value corresponding to line spacing, the judgment unit judges affirmatively, and when the smallest line spacing is equal to or less than the reference value corresponding to line spacing, the judgment unit judges negatively.

Alternatively, in the case where the condition acquisition step acquires, as one of the print conditions, a plurality of different line spacings from the PDL data, when a smallest one of the acquired different line spacings is greater than the reference value corresponding to line spacing, the judgment step judges affirmatively, and when the smallest line spacing is equal to or less than the reference value corresponding to line spacing, the judgment step judges negatively.

With this structure, in the case where a plurality of different line spacings are acquired from the PDL data as one of the print conditions, a comparison is made between a smallest one of the acquired different line spacings that corresponds to the highest toner deposition density and a reference value corresponding to line spacing. When the smallest line spacing is greater than the reference value corresponding to line spacing, it is judged that fixability of the toner image is ensured if the toner image is thermally fixed at the temperature that is lower than the predetermined temperature. When the smallest line spacing is equal to or less than the reference value corresponding to line spacing, it is judged that fixability of the toner image is not ensured if the toner image is thermally fixed at the temperature that is lower than the predetermined temperature. Therefore, it is possible to make a judgment with respect to one of the acquired different line spacings for which fixability is most difficult to ensure.

As a result, compared with the case where a judgment is made with use of any of the line spacings other than the smallest line spacing, it is possible to judge whether fixability is ensured with further accuracy, and thereby to appropriately set the fixing temperature based on results of the judgment.

In other words, in the case where a judgment is made as to whether fixability is ensured using any of the line spacings other than the smallest line spacing, fixability might not be ensured with respect to the smallest line spacing even if results of the judgment are affirmative with respect to the any of the line spacings other than the smallest line spacing. This causes a failure that despite fixability is not ensured, the fixing temperature is set to the lower limit temperature that is lower than the predetermined temperature. Compared with this, in the case where a judgment is made as to whether fixability is ensured using the smallest line spacing, such a failure is not caused.

Here, in the case where the condition acquisition unit acquires, as one of the print conditions, a plurality of different character sizes from the PDL data, when the acquired character number is less than the reference value corresponding to character number, which is determined in correspondence with a largest one of the acquired different character sizes, the judgment unit judges affirmatively, and when the acquired character number is equal to or greater than the reference value corresponding to character number, which is determined in correspondence with the largest character size, the judgment unit judges negatively.

Alternatively, in the case where the condition acquisition step acquires, as one of the print conditions, a plurality of different character sizes from the PDL data, when the acquired character number is less than the reference value corresponding to character number, which is determined in correspondence with a largest one of the acquired different character sizes, the judgment step judges affirmatively, and when the acquired character number is equal to or greater than the reference value corresponding to character number, which is determined in correspondence with the largest character size, the judgment step judges negatively.

Here, in the case where the condition acquisition unit acquires, as one of the print conditions, a plurality of different character sizes from the PDL data, when a largest one of the acquired different character sizes is less than the reference value corresponding to character size, the judgment unit judges affirmatively, and when the largest character size is equal to or greater than the reference value corresponding to character size, the judgment unit judges negatively.

Alternatively, in the case where the condition acquisition step acquires, as one of the print conditions, a plurality of different character sizes from the PDL data, when a largest one of the acquired different character sizes is less than the reference value corresponding to character size, the judgment step judges affirmatively, and when the largest character size is equal to or greater than the reference value corresponding to character size, the judgment step judges negatively.

With this structure, in the case where a plurality of different character sizes are acquired from the PDL data as one of the print conditions, a comparison is made between a largest one of the acquired different character sizes that corresponds to the highest toner deposition density per character and a reference value corresponding to character size. When the largest character size is less than the reference value corresponding to character size, it is judged that fixability of the toner image is ensured if the toner image is thermally fixed at the temperature that is lower than the predetermined temperature. When the smallest character size is equal to or greater than the reference value corresponding to character size, it is judged that fixability of the toner image is not ensured if the toner image is thermally fixed at the temperature that is lower than the predetermined temperature. Therefore, it is possible to make a judgment with respect to one of the acquired different character sizes for which fixability is most difficult to ensure.

As a result, compared with the case where a judgment is made with use of any of the character sizes other than the largest character size, it is possible to judge whether fixability is ensured with further accuracy, and thereby to appropriately set the fixing temperature based on results of the judgment.

In other words, in the case where a judgment is made as to whether fixability is ensured using any of the character sizes other than the largest character size, fixability might not be ensured with respect to the largest character size even if results of the judgment are affirmative with respect to the any of the character sizes other than the largest character size. This causes a failure that despite fixability is not ensured, the fixing temperature is set to the lower limit temperature that is lower than the predetermined temperature. Compared with this, in the case where a judgment is made as to whether fixability is ensured using the largest character size, such a failure is not caused.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. An image forming apparatus that converts page description language (PDL) data into image data for printing to form a toner image of text on a recording sheet, and thermally fixes the toner image, the PDL data prescribing text data and one or more print conditions of the text data, the image forming apparatus comprising:

a condition acquisition unit that analyzes the PDL data to acquire, as the print conditions, one or more of a character number, a character spacing, and a line spacing from the PDL data;

a judgment unit that, before conversion of the PDL data into the image data for printing, makes a judgment for each of the acquired print conditions, by comparing the acquired print condition with a reference value corresponding to the acquired print condition, the judgment indicating whether the acquired print condition is suitable for ensuring fixability of the toner image if the toner image is thermally fixed at a temperature that is lower than a predetermined temperature; and a temperature control unit that, when the judgment unit judges negatively with respect to at least one of the acquired print conditions, sets a fixing temperature at which the toner image is to be thermally fixed to the predetermined temperature, and when the judgment unit judges affirmatively with respect to all of the acquired print conditions, sets the fixing temperature to the temperature that is lower than the predetermined temperature.

2. The image forming apparatus of claim 1, wherein
in the case where the character number is acquired as one of the print conditions,
when the acquired character number is less than the reference value corresponding to character number, the judgment unit judges affirmatively,
when the acquired character number is equal to or greater than the reference value corresponding to character number, the judgment unit judges negatively,
in the case where the character spacing is acquired as one of the print conditions,
when the acquired character spacing is greater than the reference value corresponding to character spacing, the judgment unit judges affirmatively,
when the acquired character spacing is equal to or less than the reference value corresponding to character spacing, the judgment unit judges negatively, and
in the case where the line spacing is acquired as one of the print conditions,
when the acquired line spacing is greater than the reference value corresponding to line spacing, the judgment unit judges affirmatively, and
when the acquired line spacing is equal to or less than the reference value corresponding to line spacing, the judgment unit judges negatively.

3. The image forming apparatus of claim 2, wherein
the reference value corresponding to character number is determined in correspondence with a character size such that the reference value corresponding to character number decreases as the character size increases,
the condition acquisition unit further acquires, as one of the print conditions, the character size from the PDL data,
when the acquired character number is less than the reference value corresponding to character number, which is determined in correspondence with the acquired character size, the judgment unit judges affirmatively, and
when the acquired character number is equal to or greater than the reference value corresponding to character number, which is determined in correspondence with the acquired character size, the judgment unit judges negatively.

4. The image forming apparatus of claim 3, wherein
the condition acquisition unit further acquires a reduction factor or a magnification factor of the text from the PDL data, when the acquired character number after reduction by the reduction factor or magnification by the magnification factor is less than the reference value corresponding to character number, the judgment unit judges affirmatively, and
when the acquired character number after reduction by the reduction factor or magnification by the magnification factor is equal to or greater than the reference value corresponding to character number, the judgment unit judges negatively.

5. The image forming apparatus of claim 3, wherein
in the case where the condition acquisition unit acquires, as one of the print conditions, a plurality of different character sizes from the PDL data,
when the acquired character number is less than the reference value corresponding to character number, which is determined in correspondence with a largest one of the acquired different character sizes, the judgment unit judges affirmatively, and
when the acquired character number is equal to or greater than the reference value corresponding to character number, which is determined in correspondence with the largest character size, the judgment unit judges negatively.

6. The image forming apparatus of claim 2, wherein
the condition acquisition unit further acquires a reduction factor or a magnification factor of the text from the PDL data,
when the acquired character spacing after reduction by the reduction factor or magnification by the magnification factor is greater than the reference value corresponding to character spacing, the judgment unit judges affirmatively, and
when the acquired character spacing after reduction by the reduction factor or magnification by the magnification factor is equal to or less than the reference value corresponding to character spacing, the judgment unit judges negatively.

7. The image forming apparatus of claim 2, wherein
the condition acquisition unit further acquires a reduction factor or a magnification factor of the text from the PDL data,
when the acquired line spacing after reduction by the reduction factor or magnification by the magnification factor is greater than the reference value corresponding to line spacing, the judgment unit judges affirmatively, and
when the acquired line spacing after reduction by the reduction factor or magnification by the magnification factor is equal to or less than the reference value corresponding to line spacing, the judgment unit judges negatively.

8. The image forming apparatus of claim 2, wherein
in the case where the condition acquisition unit acquires, as one of the print conditions, a plurality of different character spacings from the PDL data,
when a smallest one of the acquired different character spacings is greater than the reference value corresponding to character spacing, the judgment unit judges affirmatively, and
when the smallest character spacing is equal to or less than the reference value corresponding to character spacing, the judgment unit judges negatively.

9. The image forming apparatus of claim 2, wherein
in the case where the condition acquisition unit acquires, as one of the print conditions, a plurality of different line spacings from the PDL data, when a smallest one of the acquired different line spacings is greater than the reference value corresponding to line spacing, the judgment unit judges affirmatively, and when the smallest line spacing is equal to or less than the reference value corresponding to line spacing, the judgment unit judges negatively.

10. The image forming apparatus of claim 1, wherein
the condition acquisition unit further acquires, as one of the print conditions, a character size from the PDL data, when the acquired character size is less than the reference value corresponding to character size, the judgment unit judges affirmatively, and when the acquired character size is equal to or greater than the reference value corresponding to character size, the judgment unit judges negatively.

11. The image forming apparatus of claim 10, wherein
the condition acquisition unit further acquires a reduction factor or a magnification factor of the text from the PDL data, when the acquired character size after reduction by the reduction factor or magnification by the magnification factor is less than the reference value corresponding to character size, the judgment unit judges affirmatively, and when the acquired character size after reduction by the reduction factor or magnification by the magnification factor is equal to or greater than the reference value corresponding to character size, the judgment unit judges negatively.

12. The image forming apparatus of claim 10, wherein
in the case where the condition acquisition unit acquires, as one of the print conditions, a plurality of different character sizes from the PDL data, when a largest one of the acquired different character sizes is less than the reference value corresponding to character size, the judgment unit judges affirmatively, and when the largest character size is equal to or greater than the reference value corresponding to character size, the judgment unit judges negatively.

13. The image forming apparatus of claim 1, wherein
the condition acquisition unit further acquires, as one of the print conditions, halftone information from the PDL data, the halftone information indicating whether the text data is data of text including halftone, when the acquired halftone information indicates that the text data is not data of text including halftone, the judgment unit judges affirmatively, and when the acquired halftone information indicates that the text data is data of text including halftone, the judgment unit judges negatively.

14. A temperature control method for use in an image forming apparatus that converts page description language (PDL) data into image data for printing to form a toner image of text on a recording sheet, and thermally fixes the toner image, the PDL data prescribing text data and one or more print conditions of the text data, the image temperature control method comprising:

a condition acquisition step of analyzing the PDL data to acquire, as the print conditions, one or more of a character number, a character spacing, and a line spacing from the PDL data;

a judgment step of making, before conversion of the PDL data into the image data for printing, a judgment for each of the acquired print conditions, by comparing the acquired print condition with a reference value corresponding to the acquired print condition, the judgment indicating whether the acquired print condition is suitable for ensuring fixability of the toner image if the toner image is thermally fixed at a temperature that is lower than a predetermined temperature; and a temperature control step of, when the judgment step judges negatively with respect to at least one of the acquired print conditions, setting a fixing temperature at which the toner image is to be thermally fixed to the predetermined temperature, and when the judgment step judges affirmatively with respect to all of the acquired print conditions, setting the fixing temperature to the temperature that is lower than the predetermined temperature.

15. A non-transitory computer-readable recording medium having recorded therein a temperature control program for causing an image forming apparatus to perform temperature control processing, the image forming apparatus converting page description language (PDL) data into image data for printing to form a toner image of text on a recording sheet, and thermally fixing the toner image, the PDL data prescribing text data and one or more print conditions of the text data, the image temperature control processing comprising:

a condition acquisition step of analyzing the PDL data to acquire, as the print conditions, one or more of a character number, a character spacing, and a line spacing from the PDL data;

a judgment step of making, before conversion of the PDL data into the image data for printing, a judgment for each of the acquired print conditions, by comparing the acquired print condition with a reference value corresponding to the acquired print condition, the judgment indicating whether the acquired print condition is suitable for ensuring fixability of the toner image if the toner image is thermally fixed at a temperature that is lower than a predetermined temperature; and a temperature control step of, when the judgment step judges negatively with respect to at least one of the acquired print conditions, setting a fixing temperature at which the toner image is to be thermally fixed to the predetermined temperature, and when the judgment step judges affirmatively with respect to all of the acquired print conditions, setting the fixing temperature to the temperature that is lower than the predetermined temperature.

16. The recording medium of claim 15,
in the case where the character number is acquired as one of the print conditions, when the acquired character number is less than the reference value corresponding to character number, the judgment step judges affirmatively, when the acquired character number is equal to or greater than the reference value corresponding to character number, the judgment step judges negatively, in the case where the character spacing is acquired as one of the print conditions, when the acquired character spacing is greater than the reference value corresponding to character spacing, the judgment step judges affirmatively, when the acquired character spacing is equal to or less than the reference value corresponding to character spacing, the judgment step judges negatively, in the case where the line spacing is acquired as one of the print conditions, and when the acquired line spacing is greater than the reference value corresponding to line spacing, the judgment step judges affirmatively, and when the acquired line spacing is equal to or less than the reference value corresponding to line spacing, the judgment step judges negatively.

17. The recording medium of claim 16,
the reference value corresponding to character number is determined in correspondence with a character size such that the reference value corresponding to character number decreases as the character size increases,
the condition acquisition step further acquires, as one of the print conditions, the character size from the PDL data,
when the acquired character number is less than the reference value corresponding to character number, which is determined in correspondence with the acquired character size, the judgment step judges affirmatively, and
when the acquired character number is equal to or greater than the reference value corresponding to character number, which is determined in correspondence with the acquired character size, the judgment step judges negatively.

18. The recording medium of claim 17,
the condition acquisition step further acquires a reduction factor or a magnification factor of the text from the PDL data,
when the acquired character number after reduction by the reduction factor or magnification by the magnification factor is less than the reference value corresponding to character number, the judgment step judges affirmatively, and
when the acquired character number after reduction by the reduction factor or magnification by the magnification factor is equal to or greater than the reference value corresponding to character number, the judgment step judges negatively.

19. The recording medium of claim 17,
in the case where the condition acquisition step acquires, as one of the print conditions, a plurality of different character sizes from the PDL data,
when the acquired character number is less than the reference value corresponding to character number, which is determined in correspondence with a largest one of the acquired different character sizes, the judgment step judges affirmatively, and
when the acquired character number is equal to or greater than the reference value corresponding to character number, which is determined in correspondence with the largest character size, the judgment step judges negatively.

20. The recording medium of claim 16,
the condition acquisition step further acquires a reduction factor or a magnification factor of the text from the PDL data,
when the acquired character spacing after reduction by the reduction factor or magnification by the magnification factor is greater than the reference value corresponding to character spacing, the judgment step judges affirmatively, and
when the acquired character spacing after reduction by the reduction factor or magnification by the magnification factor is equal to or less than the reference value corresponding to character spacing, the judgment step judges negatively.

21. The recording medium of claim 16,
the condition acquisition step further acquires a reduction factor or a magnification factor of the text from the PDL data,
when the acquired line spacing after reduction by the reduction factor or magnification by the magnification factor is greater than the reference value corresponding to line spacing, the judgment step judges affirmatively, and
when the acquired line spacing after reduction by the reduction factor or magnification by the magnification factor is equal to or less than the reference value corresponding to line spacing, the judgment step judges negatively.

22. The recording medium of claim 16,
in the case where the condition acquisition step acquires, as one of the print conditions, a plurality of different character spacings from the PDL data,
when a smallest one of the acquired different character spacings is greater than the reference value corresponding to character spacing, the judgment step judges affirmatively, and
when the smallest character spacing is equal to or less than the reference value corresponding to character spacing, the judgment step judges negatively.

23. The recording medium of claim 16,
in the case where the condition acquisition step acquires, as one of the print conditions, a plurality of different line spacings from the PDL data,
when a smallest one of the acquired different line spacings is greater than the reference value corresponding to line spacing, the judgment step judges affirmatively, and
when the smallest line spacing is equal to or less than the reference value corresponding to line spacing, the judgment step judges negatively.

24. The recording medium of claim 15,
the condition acquisition step further acquires, as one of the print conditions, a character size from the PDL data,
when the acquired character size is less than the reference value corresponding to character size, the judgment step judges affirmatively, and
when the acquired character size is equal to or greater than the reference value corresponding to character size, the judgment step judges negatively.

25. The recording medium of claim 24,
the condition acquisition step further acquires a reduction factor or a magnification factor of the text from the PDL data,
when the acquired character size after reduction by the reduction factor or magnification by the magnification factor is less than the reference value corresponding to character size, the judgment step judges affirmatively, and
when the acquired character size after reduction by the reduction factor or magnification by the magnification factor is equal to or greater than the reference value corresponding to character size, the judgment step judges negatively.

26. The recording medium of claim 24,
in the case where the condition acquisition step acquires, as one of the print conditions, a plurality of different character sizes from the PDL data,
when a largest one of the acquired different character sizes is less than the reference value corresponding to character size, the judgment step judges affirmatively, and
when the largest character size is equal to or greater than the reference value corresponding to character size, the judgment step judges negatively.

27. The recording medium of claim 15,
the condition acquisition step further acquires, as one of the print conditions, halftone information from the PDL data, the halftone information indicating whether the text data is data of text including halftone, when the acquired halftone information indicates that the text data is not data of text including halftone, the judgment step judges affirmatively, and when the acquired halftone information indicates that the text data is data of text including halftone, the judgment step judges negatively.

\* \* \* \* \*